(12) United States Patent
Grube

(10) Patent No.: US 6,427,066 B1
(45) Date of Patent: Jul. 30, 2002

(54) APPARATUS AND METHOD FOR EFFECTING COMMUNICATIONS AMONG A PLURALITY OF REMOTE STATIONS

(75) Inventor: Gary W. Grube, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 17 days.

(21) Appl. No.: 09/607,420

(22) Filed: Jun. 30, 2000

(51) Int. Cl.$^7$ .......................... H04B 1/38; H01L 21/20; H01L 27/01

(52) U.S. Cl. .......................... 455/73; 455/81; 455/575; 455/347; 370/338; 438/478; 438/488; 438/2; 257/295; 257/347

(58) Field of Search .............................. 455/73, 78, 81, 455/84, 90, 575, 450, 452, 453, 509, 517, 523, 347; 370/311, 312, 337, 338; 438/2, 31, 32, 275, 478–491; 257/295, 347, 506; 117/200, 900

(56) References Cited

U.S. PATENT DOCUMENTS

| | | |
|---|---|---|
| 3,766,370 A | 10/1973 | Walther |
| 3,802,967 A | 4/1974 | Ladany et al. |
| 4,006,989 A | 2/1977 | Andringa |

(List continued on next page.)

FOREIGN PATENT DOCUMENTS

| | | |
|---|---|---|
| EP | 0 250 171 | 12/1987 |
| EP | 0 342 937 | 11/1989 |
| EP | 0 455 526 | 6/1991 |

(List continued on next page.)

OTHER PUBLICATIONS

Nakagawara et al., Effects of Buffer Layers in Epitaxial Growth of SrTiO$_3$ Thin Film on Si(100), *J. Appl. Phys.*, 78 (12), Dec. 15, 1995, pp. 7226–7230.

(List continued on next page.)

*Primary Examiner*—Vivian Chin
*Assistant Examiner*—Duc Nguyen
(74) *Attorney, Agent, or Firm*—Oblon, Spivak, McClelland, Maier & Neustadt, P.C.

(57) ABSTRACT

An apparatus for communications by a home station among remote stations in at least one communication medium. The apparatus comprises (a) local signal receiving circuitry for receiving an originating signal containing local intelligence; and (b) local signal processing circuitry for conveying the local intelligence via a communication medium to a target remote station; (c) remote signal receiving circuitry for receiving a transmitted signal containing remote intelligence; and (d) remote signal processing circuitry coupled with the remote signal receiving circuitry for processing the transmitted signal for conveying the remote intelligence to a user. The local signal receiving circuitry, the local signal processing circuitry, the remote signal receiving circuitry and the remote signal processing circuitry are implemented in a unitary structure borne upon a single silicon substrate. The method comprises the steps of: (a) providing an apparatus implemented in a unitary structure borne upon a single silicon substrate; (b) providing information processing circuitry implemented in the unitary structure for dynamically determining network routing among the remote stations for establishing communications with at least one target remote station not in direct communication with the home station; (c) ascertaining input and output capabilities of the home station; (d) polling selected remote stations to ascertain their network capabilities; (e) defining at least one primary network route among the remote stations for communicating with the target remote station; and (f) conveying the local intelligence via a communication medium to the target remote station using the primary network route.

43 Claims, 10 Drawing Sheets

U.S. PATENT DOCUMENTS

| | | |
|---|---|---|
| 4,174,422 A | 11/1979 | Matthews et al. |
| 4,284,329 A | 8/1981 | Smith et al. |
| 4,404,265 A | 9/1983 | Manasevit |
| 4,482,906 A | 11/1984 | Hovel et al. |
| 4,484,332 A | 11/1984 | Hawrylo |
| 4,523,211 A | 6/1985 | Morimoto et al. |
| 4,661,176 A | 4/1987 | Manasevit |
| 4,777,613 A | 10/1988 | Shahan et al. |
| 4,793,872 A | 12/1988 | Meunier et al. |
| 4,802,182 A | 1/1989 | Thornton et al. |
| 4,815,084 A | 3/1989 | Scifres et al. |
| 4,846,926 A | 7/1989 | Kay et al. |
| 4,855,249 A | 8/1989 | Akasaki et al. |
| 4,876,219 A | 10/1989 | Eshita et al. |
| 4,882,300 A | 11/1989 | Inoue et al. |
| 4,891,091 A | 1/1990 | Shastry |
| 4,896,194 A | 1/1990 | Suzuki |
| 4,912,087 A | 3/1990 | Aslam et al. |
| 4,928,154 A | 5/1990 | Umeno et al. |
| 4,963,508 A | 10/1990 | Umeno et al. |
| 4,963,949 A | 10/1990 | Wanlass et al. |
| 4,999,842 A | 3/1991 | Huang et al. |
| 5,060,031 A | 10/1991 | Abrokwah et al. |
| 5,063,166 A | 11/1991 | Mooney et al. |
| 5,081,062 A | 1/1992 | Vasudev et al. |
| 5,116,461 A | 5/1992 | Lebby et al. |
| 5,127,067 A | 6/1992 | Delcocco et al. |
| 5,141,894 A | 8/1992 | Bisaro et al. |
| 5,144,409 A | 9/1992 | Ma |
| 5,155,658 A | 10/1992 | Inam et al. |
| 5,159,413 A | 10/1992 | Calviello et al. |
| 5,173,474 A | 12/1992 | Connell et al. |
| 5,221,367 A | 6/1993 | Chisholm et al. |
| 5,225,031 A | 7/1993 | McKee et al. |
| 5,248,564 A | 9/1993 | Ramesh |
| 5,270,298 A | 12/1993 | Ramesh |
| 5,286,985 A | 2/1994 | Taddiken |
| 5,293,050 A | 3/1994 | Chapple-Sokol et al. |
| 5,310,707 A | 5/1994 | Oishi et al. |
| 5,326,721 A | 7/1994 | Summerfelt |
| 5,356,831 A | 10/1994 | Calviello |
| 5,358,925 A | 10/1994 | Connell et al. |
| 5,371,734 A * | 12/1994 | Fischer ........................ 370/18 |
| 5,391,515 A | 2/1995 | Kao et al. |
| 5,393,352 A | 2/1995 | Summerfelt |
| 5,404,581 A | 4/1995 | Honjo |
| 5,418,216 A | 5/1995 | Fork |
| 5,418,389 A | 5/1995 | Watanabe |
| 5,436,759 A | 7/1995 | Dijaii et al. |
| 5,442,191 A | 8/1995 | Ma |
| 5,444,016 A | 8/1995 | Abrokwah et al. |
| 5,450,812 A | 9/1995 | McKee et al. |
| 5,478,653 A | 12/1995 | Guenzer |
| 5,480,829 A | 1/1996 | Abrokwah et al. |
| 5,482,003 A | 1/1996 | McKee et al. |
| 5,511,238 A * | 4/1996 | Bayraktaroglu .............. 455/81 |
| 5,514,484 A | 5/1996 | Nashimoto |
| 5,528,414 A | 6/1996 | Oakley |
| 5,556,463 A | 9/1996 | Guenzer |
| 5,576,879 A | 11/1996 | Nashimoto |
| 5,588,995 A | 12/1996 | Sheldon |
| 5,606,184 A | 2/1997 | Abrokwah et al. |
| 5,614,739 A | 3/1997 | Abrokwah et al. |
| 5,640,267 A | 6/1997 | May et al. |
| 5,670,798 A | 9/1997 | Schetzina |
| 5,674,366 A | 10/1997 | Hayashi et al. |
| 5,729,394 A | 3/1998 | Sefier et al. |
| 5,729,641 A | 3/1998 | Chandonnet et al. |
| 5,731,220 A | 3/1998 | Tsu et al. |
| 5,733,641 A | 3/1998 | Fork et al. |
| 5,735,949 A | 4/1998 | Mantl et al. |
| 5,741,724 A | 4/1998 | Ramdani et al. |
| 5,764,676 A | 6/1998 | Paoli et al. |
| 5,777,762 A | 7/1998 | Yamamoto |
| 5,778,018 A | 7/1998 | Yoshikawa et al. |
| 5,778,116 A | 7/1998 | Tomich |
| 5,790,583 A | 8/1998 | Ho |
| 5,801,105 A | 9/1998 | Yano et al. |
| 5,810,923 A | 9/1998 | Yano et al. |
| 5,825,799 A | 10/1998 | Ho et al. |
| 5,828,080 A | 10/1998 | Yano et al. |
| 5,830,270 A | 11/1998 | McKee et al. |
| 5,846,846 A * | 12/1998 | Suh et al. ....................... 438/2 |
| 5,857,049 A | 1/1999 | Beranek et al. |
| 5,858,814 A | 1/1999 | Goossen et al. |
| 5,861,966 A | 1/1999 | Ortel |
| 5,874,860 A | 2/1999 | Brunel et al. |
| 5,883,996 A | 3/1999 | Knapp et al. |
| 5,912,068 A | 6/1999 | Jia |
| 5,926,496 A | 7/1999 | Ho et al. |
| 5,937,285 A | 8/1999 | Abrokwah et al. |
| 5,981,400 A | 11/1999 | Lo |
| 5,987,011 A * | 11/1999 | Toh ........................... 370/331 |
| 5,990,495 A | 11/1999 | Ohba |
| 5,995,359 A | 11/1999 | Klee et al. |
| 6,002,375 A | 12/1999 | Corman et al. |
| 6,008,762 A | 12/1999 | Nghiem |
| 6,020,222 A | 2/2000 | Wollesen |
| 6,028,853 A * | 2/2000 | Haartsen ..................... 370/338 |
| 6,045,626 A | 4/2000 | Yano et al. |
| 6,049,702 A * | 4/2000 | Tham et al. .................. 455/78 |
| 6,055,179 A | 4/2000 | Koganei et al. |
| 6,058,131 A | 5/2000 | Pan |
| 6,064,078 A | 5/2000 | Northrup et al. |
| 6,064,092 A | 5/2000 | Park |
| 6,093,242 A * | 7/2000 | McKee et al. ................. 117/2 |
| 6,268,269 B1 * | 7/2000 | Lee et al. ................... 438/473 |
| 6,096,584 A | 8/2000 | Ellis-Monaghan et al. |
| 6,103,008 A | 8/2000 | McKee et al. |
| 6,107,653 A | 8/2000 | Fitzgerald |
| 6,113,690 A | 9/2000 | Yu et al. |
| 6,114,996 A | 9/2000 | Nghiem |
| 6,121,642 A | 9/2000 | Newns |
| 6,128,178 A | 10/2000 | Newns |
| 6,136,666 A | 10/2000 | So |
| 6,137,603 A | 10/2000 | Henmi |
| 6,143,072 A | 11/2000 | McKee et al. |
| 6,146,906 A | 11/2000 | Inoue et al. |
| 6,153,454 A * | 11/2000 | Krivokapic ................. 438/225 |
| 6,173,474 B1 | 1/2001 | Corad |
| 6,174,755 B1 | 1/2001 | Manning |
| 6,180,252 B1 | 1/2001 | Farrell et al. |
| 6,180,486 B1 | 1/2001 | Leobandung et al. |
| 6,184,144 B1 | 2/2001 | Lo |
| 6,222,654 B1 | 4/2001 | Frigo |
| 6,248,621 B1 * | 6/2001 | Wilk et al. .................. 438/237 |

FOREIGN PATENT DOCUMENTS

| | | |
|---|---|---|
| EP | 0 514 018 | 11/1992 |
| EP | 0 602 568 | 6/1994 |
| EP | 0 607 435 | 7/1994 |
| EP | 0 999 600 | 5/2000 |
| EP | 1 001 468 | 5/2000 |
| GB | 1 319 311 | 6/1970 |
| GB | 2 335 792 | 9/1999 |
| JP | 52-88354 | 7/1977 |
| JP | 54-134554 | 10/1979 |
| JP | 55-87424 | 7/1980 |
| JP | 61-108187 | 5/1986 |
| JP | 63-34994 | 2/1988 |
| JP | 63-131104 | 6/1988 |

| JP | 63-198365 | 8/1988 |
| JP | HEI 2-391 | 1/1990 |
| JP | 63-278629 | 1/1990 |
| JP | 5-48072 | 2/1993 |
| JP | 6-232126 | 8/1994 |
| JP | 6-291299 | 10/1994 |
| JP | 6-33 4168 | 12/1994 |
| JP | 10-321943 | 12/1998 |
| JP | 11-238683 | 8/1999 |
| JP | 11-260835 | 9/1999 |
| WO | WO 97/45827 | 12/1997 |
| WO | WO 99/14797 | 3/1999 |
| WO | WO 99/14804 | 3/1999 |
| WO | WO 99/19546 | 4/1999 |
| WO | WO 99/63580 | 12/1999 |
| WO | WO 00/33363 | 6/2000 |
| WO | WO 00/48239 | 8/2000 |

OTHER PUBLICATIONS

Suzuki et al., "A Proposal of Epitaxial Oxide Thin Film Structures For Future Oxide Electronics," *Materials Science and Engineering B41*, (1996), pp. 166–173.

W. F. Egelhoff et al., "Optimizing GMR Spin Valves: The Outlook for Improved Properties", *1998 Int'l Non Volatile Memory Technology Conference*, pp. 34–37.

Wang et al., "Processing and Performance of Piezoelectric Films", Univ. Of MD, Wilcoxon Research Col, and Motorola Labs, May 11, 2000.

M. Rotter et al., "Nonlinear Acoustoelectric Interactions in GaAs/LiNbO$_3$ Structures", *Applied Physics Letters*, vol. 75(7), Aug. 16, 1999, pp. 965–967.

K. Sreenivas et al., "Surface Acoustic Wave Propagation on Lead Zirconate Titanate Thin Films," *Appl. Phys. Lett.* 52 (9), Feb. 29, 1998, pp. 709–711.

M. Rotter et al., "Single Chip Fused Hybrids for Acousto–Electric and Acousto–Optic Applications," *1997 Applied Physics Letters*, vol. 70(16), Apr. 21, 1997, pp. 2097–2099.

A. Mansingh et al., "Surface Acoustic Wave Propagation in PZT/YBCO/SrTiO$_3$ and PbTiO$_3$/YBCO/SrTiO$_3$ Epitaxial Heterostructures," *Ferroelectric*, vol. 224, pp. 275–282, 1999.

S. Mathews et al., "Ferroelectric Field Effect Transisitor Based on Epitaxial Perovskite Heterostructures", Science, vol. 276, Apr. 11, 1997, pp. 238–240.

R. Houdre et al., "Properties of GaAs on Si Grown by Molecular Beam Epitaxy," *Solid State and Materials Sciences*, vol. 16, Issue 2, 1990, pp. 91–114.

S. F. Fang et al., "Gallium Arsenide and Other Compound Semiconductors on Silicon," *J. Appl. Phys.*, 68(7), Oct. 1, 1990, pp. R31–R58.

Carlin et al., Impact of GaAs Buffer Thickness on Electronic Quality of GaAs Grown on Graded Ge/GeSi/Si Substrates, *Appl. Phys. Letter*, vol. 76, No. 14, Apr. 2000, pp. 1884–1886.

Ringel et al., "Epitaxial Integration of III–V Materials and Devices with Si Using Graded GeSi Buffers," 27$^{th}$ International Symposium on Compound Semiconductors, Oct. 2000.

Zogg et al., "Progress in Compound–Semiconductor–on–Silicon–Heteroepitaxy with Fluoride Buffer Layers," *J. Electrochem Soc.*, vol. 136, No. 3, Mar. 1998, pp. 775–779.

Xiong et al., "Oxide Defined GaAs Vertical–Cavity Surface–Emitting Lasers on Si Substrates," *IEEE Photonics Technology Letters*, vol. 12, No. 2, Feb. 2000, pp. 110–112.

Clem et al., "Investigation of PZT//LSCO//Pt//Aerogel Thin Film Composites for Uncooled Pyroelectric IR Detectors," *Mat. Res. Soc. Symp. Proc.*, vol. 541, pp. 661–666, 1999.

Gunapala et al., "Bound–To–Quasi–Bound Quantum–Well Infrared Photodetectors," NASA Tech Brief, vol. 22, No. 9, Sep. 1998.

Brown et al., "Photodetectors: Materials and Devices II," *Intn. Society for Optical Engineering*, vol. 2999, pp. 211–214.

Bruley et al., "Nanostructure and Chemistry of a (100)MgO/ (100) GaAs Interface," *Appl. Phys Lett*, 65(5), Aug. 1994, pp. 564–566.

Fork et al., "Epitaxial MgO On Si(001) for Y–Ba–Cu–O Thin Film Growth by Pulsed Laser Deposition," *Appl. Phys Lett.*, 58(20), May 20, 1991, pp. 2294–2296.

Himpsel et al., "Dialectrics on Semiconductors," *Materials Science and Engineering*, B1(1988), pp. 9–13.

Li et al., "Epitaxial La$_{0.67}$Sr$_{0.33}$MnO$_3$ Magnetic Tunnel Junctions," *J. Appl. Phys.* 81(8), Apr. 15, 1997, pp. 5509–5511.

O'Donnell et al., "Colossal Magnetoresistance Magnetic Tunnel Junctions Grown by Molecular–Beam Epitaxy," *Appl. Physics Letters*, vol. 76, No. 14, Apr. 3, 2000, pp. 1914–1916.

Mikami et al., "Formation of Si Epi/MgO–Al$_2$O$_3$Epi./SiO$_3$/ Si and Its Epitaxial Film Quality," Fundamental Research Laboratories and Microelectronics Laboratories, pp. 31–34, 1983.

T. Asano et al., "An Epitaxial Si/Insulator/Si Structure Prepared by Vacuum Deposition of CaF$_2$ and Silicon," *Thin Solid Films*, vol. 93 (1982), pp. 143–150.

T. Chikyow et al., "Reaction and Regrowth Control of CeO$_2$ on Si(111) Surface for the Silicon–On–Insulator Structure," *Appl. Phys. Lett.*, vol. 65, No. 8, Aug. 22, 1994, pp. 1030–1032.

J.F. Kang, et al., "Epitaxial Growth of CeO$_2$(100) Films on Si(100) Substrates by Dual Ion Beams Reactive Sputtering," *Solid State Communications*, vol. 108, No. 4, pp. 225–227, 1998.

R.A. Morgan et al., "Vertical–Cavity Surface–Emitting Lasers Come of Age," *SPIE*, vol. 2683, pp. 18–29.

"Technical Analysis of Qualcomm QCP–800 Portable Cellular Phone (Transmitter Circuitry)," Talus Corporation, Qualcomm QCP–800 Technical Analysis Report, Dec. 10, 1996, pp. 5–8.

Jo–Ey Wong, et al.; "An Electrostatically–Actuated Mems Switch For Power Applications"; IEEE, 2000; pp. 633–638.

T. Mizuno, et al.; "Electron and Hole Mobility Enhancement in Strained–Si MOSFET's on SiGe–on–Insulator Substrates Fabricated by SIMOX Technology"; IEEE Electron Device Letters, vol. 21. No. 5, May 2000; pp. 230–232.

F.M. Buffer, et al.; "Strain–dependence of electron transport in bulk Si and deep–submicron MOSFET's" Computatural Electronics, 2000, Book of Abstracts, IWCE Glasgow 2000, 7$^{th}$ Int'l Workshop on, 2000; pp. 64–65.

S.S. Lu, et al.; "Piezoelectric field effect transistor (PEFET) using In$_{0.2}$Ga$_{0.8}$As/Al$_{0.35}$Ga$_{0.65}$As/In$_{0.2}$Ga$_{0.8}$As/GaAs Strained layer structure on (111)B GaAs substrate"; Electronics Letters, 12$^{TH}$ Ma 1994, vol. 30, No. 10; pp. 823–825.

Kihong Kim, et al."On–Chip Wireless Interconnection with Integrated Antennas"; 2000 IEEE; pp. 20.2.1–20.3.4.

G. Passiopoulos, et al.; "V–Band Single Chip, Direct Carrier BPSK Modulation Transmitter With Integrated Patch Antenna"; 1998 IEEE MTT–S Digest; pp. 305–308.

Mau–Chung Frank Chang, et al.; "RF/Wireless Interconnect for Inter– and Intra–Chip Communications"; Proceedings of the IEEE, vol. 89, No. 4, Apr. 2001; pp. 456–466.

The Electronics Industry Report; Prismark; 2001; pp. 111–120.

J.K. Abrokwah, et al.; "A Manufacturable Complementary GaAs Process"; GaAs IC Symposium, IEEE, 1993; pp. 127–130.

H. Nagata, "A Preliminary Consideration of the Growth Behaviour of $CeO_2$, $SrTiO_3$ and $SrVO_3$ Films on Si Substrate," *Thin Solid Films*, 224, 1993, pp. 1–3.

Nagata et al., "Heteroepitaxial Growth of $CeO_2(001)$ Films on Si(001) Substrates by Pulsed Laser Deposition in Ultra-high Vacuum," *Jpn. Jour. Appl. Phys.*, vol. 30, No. 6B, Jun. 1991, pp. L1136–L1138.

Kado et al., "Heteroepitaxial Growth of SrO Films on Si Substrates," *J. Appl. Phys.*, 61(6), Mar. 15, 1987, pp. 2398–2400.

Bean et al., "Silicon Molecular Beam Epitaxy," *Materials Research Symposium Proceedings*, vol. 220, pp. 595–600, Apr. 29—May 3, 1991.

J.K. Abrokwah, et al.; "A Manufacturable High–Speed Low– Power Complementary GaAs Process"; Extended Abstracts of the 1994 International Conference on Solid State Devices and Materials, Yokohama, 1994, pp. 592–594.

Leonard J. Brillson; "Stable and Epitaxial Contacts to III–V Compound Semiconductors"; Semiconductors Fundamentals and Technology; Noyles Publications, 1993; pp. 67–150.

Jayshri Sabarinathat, et al.; "Submicron three–dimensional infrared $GaAs/Al_xO_y$–based photonic crystal using single–step epitaxial growth"; Applied Physics Letters, vol. 78, No. 20, May 14, 2001; pp. 3024–3026.

Philip Ball; "The Next Generation of Optical Fibert"; Technology Review, May 2001; pp. 55–61.

John D. Joannopoulos, et al.; "Molding the Flow of Light"; Photonic Crystals; Princeton University Press, 1995.

Thomas F. Krauss, et al.; "Photonic crystals in the optical regime—past, present and future"; Progress in Quantum Electronics 23 (1999) 51–96.

G. H. Jin, et al.; "PLZT Film Waveguide Mach–Zehnder Electrooptic Modulator"; Journal of Lightwave Technology, vol. 18, No. 6. Jun. 2000; pp. 807–812.

D.E. Aspnes, et al.; "Steps on (001) silicon surfaces"; J. Vac. Sci. Technol. B, vol. 5, No. 4, Jul./Aug. 1987; pp. 939–944.

D.M. Newns, et al.; "Mott transition field effect transistor"; Applied Physics Letters, vol. 73, No. 6, Aug. 10, 1998; pp. 780–782.

Lucent Technologies, Inc. "Arrayed Waveguide Grating Multiplexer/Demultiplexer"; Jan. 2000; 4 pages.

Hisashi Shichijo, et al.; "Co–Integration of GaAs MESFET and Si CMOS Circuits"; IEEE Electron Device Letters, vol. 9, No. 9, Sep. 1988; pp. 444–446.

H. Shichijo, et al.; "GaAs MESFET and Si CMOS Cointegration and Circuit Techniques"; 1988 IEEE; GaAs IC Symposium—239–242.

H. Shichijo, et al.; "Monolithic Process for Co–Integration of GaAs and Silicon Circuits"; 1988 IEEE; pp. 778–781.

Z.H. Zhu, et al. "Growth of InGaAs multi–quantum wells at 1.3$\mu$m wavelength on GaAs compliant substrates"; Applied Physics Letters, vol. 72, No. 20, May 18, 1998; pp. 2598–2600.

Kurt Eisenbeiser, et al.; "Metamorphic InAlAs/InGaAs Enhancement Mode HEMT's on GaAs Substrates"; IEEE Electron Device Letters, vol. 20, No. 10, Oct. 1999; pp. 507–509.

Tomonori Nagashima, et al.; "Three–Terminal Tandem Solar Cells With a Back–Contact Type Bottom Cell" Higashifuji Technical Center, Toyota Motor Corporation; 4 pages.

James Schellenberg, et al.; "Low–Loss, Planar Monolithic Baluns for K/Ka–Band Applications"; 1999 IEEE MTT–S Digest; pp. 1733–1736.

Patent Abstracts of Japan, vol. 010, No. 289, Oct. 2, 1986 & JP 61 108187, May 26, 1986.

Patent Abstracts of Japan, vol. 017, No. 344 & JP 05 048072, Feb. 26, 1993.

Patent Abstracts of Japan, vol. 1999, No. 14, Dec. 22, 1999 & JP 11 260835, Sep. 24, 1999.

Patent Abstracts of Japan, vol. 012, No. 388, Oct. 17, 1988 & JP 63 131104, Jun. 3, 1988.

Patent Abstracts of Japan, vol. 012, No. 246, Jul. 12, 1988 & JP 63 034994, Feb. 15, 1988.

Patent Abstracts of Japan, vol. 012, No. 077, Mar. 10, 1988 & JP 62 216600, Sep. 24, 1987.

R.D. Vispute; "High quality optoelectronic grade epitaxial AlN films on $\alpha-Al_2O_3$, Si and 6H–SiC by pulsed laser deposition"; Thin Solid Films 299 (1997), pp. 94–103.

T. Warren Weeks, et al.; "GaN thin films deposited via organometallic vapor phase epitaxy on $\alpha(6H)-SiC(0001)$ using high–temperature monocrystalline AlN buffer layers" 320 Applied Physics Letters, vol. 67, No. 3, Jul. 17, 1995, pp401–403.

Z. Yu, et al.; "Epitaxial oxide thin films on SI(001)*"; J. Vac. Sci. Technol. B. vol. 18, No. 4, Jul./Aug. 2000; pp. 2139–2145.

Patent Abstracts of Japan, vol. 015, No. 098, Mar. 8, 1991 & JP 02 306680. Dec. 20, 1990.

Peter S. Guilfoyle, et al.; "Optoelectronic Architecture for High–Speed Switching and Processing Applications"; 1998 The Photonics Design and Applications Handbook; pp. H–399–H–406.

Antonio Mecozzi, et al.; "The Roles of Semiconductor Optical Amplifiers in Optical Newtorks"; Optics & Photonics News; Mar. 2001; pp. 37–42.

D.A. Francis, et al.; "A single–chip linear optical amplifier"; OFC, 2001; Mar. 17–22, 2001.

"Integration of GaAs on Si Using a Spinel Buffer Layer", IBM Technical Bulletin, vol. 30, No. 6, Nov. 1987, p. 365.

"GaInAs Superconducting FET," IBM Technical Bulletin, vol. 36, No. 8, Aug. 1993, p. 655–656.

"Epitaxial 3d Structure Using Mixed Spinels," IBM Technical Bulletin, vol. 30, No. 3, Aug. 1987, p. 1271.

Moon et al., "Roles of Buffer Layers in Epitaxial Growth of $SrTiO_3$ Films on Silicon Substrates," *Japan J of Appl. Phys.*, vol. 33, Mar. 1994, pp. 1472–1477.

Yodo et al., GaAs Heteroepitaxial Growth on Si Substrates with Thin Si Interlayers in situ Annealed at High Temperatures, 8257b *Journal of Vacuum Science & Technology*, May/Jun. 1995, vol. 13, No. 3, pp. 1000–1005.

Cuomo et al., "Substrate Effect on the Superconductivity of $YBa_2Cu_3O_7$ Thin Films," AIP Conference 1988, pp. 141–148.

McKee et al., "Crystalline Oxides on Silicon: The First Five Monolayers," *Physical Review Letters*, vol. 81, No. 14, Oct. 1998, pp. 3014–3017.

McKee et al., "Molecular Beam Epitaxy Growth of Epitaxial Barium Silicide, Barium Oxide, and Barium Titanate on Silicon," *1991 American Institute of Physics*, pp. 782–784, Aug. 13, 1991.

Tambo et al., Molecular Beam Epitaxy Growth of $SrTiO_3$ Films on Si(100)–2×1 with SrO Buffer Layer, *Jpn. J. Appl. Phys.*, vol. 37, 1998, pp. 4454–4459.

McKee et al., "The MBE Growth and Optical Quality of $BaTiO_3$ and $SrTiO_3$ Thin Films on MgO," *Mat. Res. Soc. Symp. Proc.*, vol. 341, Apr. 1994, pp. 309–314.

McKee et al., "$BaSi_2$ and Thin Film Alkaline Earth Silicides on Silicon," *Appl. Phys. Lett.*, 63 (20), Nov. 1993, pp. 2818–2820.

McKee et al., "Surface Structures and the Orthorhombic Transformation of Thin Film $BaSi_2$ on Silicon," *Mat. Res. Soc. Symp. Proc.*, vol. 221, pp. 131–136.

Brian A. Floyd, et al.; "The projected Power Consumption of a Wireless Clock Distribution System and Comparison to Conventional Distribution Systems"; IEEE, 1999; pp. IITC99–249–IITC99–250.

Mori et al., "Epitaxial Growth of $SrTiO_3$ Films on Si(100) Substrates Using a Focused Electron Beam Evaporation Method," *Jpn. J. of Apl. Phys.*, vol. 30, No. 8A, Aug. 1991, pp. L1415–L1417.

Moon et al., "Growth of Crystalline $SrTiO_3$ Films on Si Substrates Using Thin Fluoride Buffer Layers and Their Electrical Properties," *Jpn. J. of Appl. Phys.*, vol. 33, (1994), pp. 5911–5916.

Farrow et al., "Heteroepitaxy of Dissimilar Materials," *Mat. Res. Soc. Symposium Proceedings*, vol. 221, pp. 29–34, Apr. 29—May 2, 1991.

Choi et al., "Heteroepitaxy on Silicon: Fundamentals, Structure, and Devices," *Mat. Res. Soc.*, Symposium Proceedings, vol. 116, pp. 369–374, Apr. 5–8, 1988.

Douglas B. Chrisey, et al; Pulsed Laser Deposition of Thin Films; pp. 273–285.

B.A. Block, et al; "Photoluminescence properties of $Er^3$–doped $BaTiO_3$ thin films"; Appl. Phys. Lett. 65 (1), Jul. 4, 1994, pp. 25–27.

Gentex Corporate Website; Photoelectric Smoke Detectors—How They Work; 2001.

Jeffrey B. Casady, et al.; "A Hybrid 6H–SiC Temperature Sensor Operational from 25° C to 500° C"; IEEE Transactions On Components, Packaging, And Manufacturing Technology—Part A, vol. 19, No. 3, Sep. 1996; pp. 416–422.

Ronald W. Waynant, et al.; "Optoelectronic Integrated Circuits"; Electro–Optics Handbook, McGraw–Hill, Inc., 1994; Chapter Twenty Seven.

\* cited by examiner

APPARATUS AND METHOD FOR EFFECTING COMMUNICATIONS AMONG A PLURALITY OF REMOTE STATIONS

FIELD OF THE INVENTION

High speed communications among individual chips within products or among products require interfaces such as high speed buses, I/O (input/output) interfaces for optical links or high speed RF (radio frequency) links, or other interface structures. Integration of the several devices that comprise a product into a unitary structure eliminates the need for some of the interfaces required for signal hand off, buffering and other functions that must be accomplished in a multi-element product. Prior art fabrication techniques available for producing unitary structures involving various semiconductor materials have proven prohibitively costly and space-inefficient to yield significant improvements by unifying structures.

A unitary communication structure reduces the need for individual I/O interfaces for each module transition, and thereby eliminates the need for on-chip "real estate" to accommodate such I/O interfaces. Other advantages realized by a cost-efficient unitary fabrication ability include a significant reduction in size, an increase in operating speed, a reduction of electromagnetic noise and radiation emanations, an increase in performance reliability, a reduction in cost of manufacture and lower operating power requirements with an attendant lower cost of operation.

A capability for truly unitary fabrication employing a variety of semiconductor manufacturing technologies provides opportunities to produce multi-technology unitary structures that meet a wide variety of needs. For example, unitary structures may be fabricated to satisfy a wide variety of standards, such as cellular telephone standards, personal communication system (PCS) standards, "Bluetooth" communication standards, and other industry-wide standards.

There is a need for a communication apparatus manifested in a cost-effective integrated unitary structure appropriate for high speed communications, especially for such communications involving dynamic determination of message routing.

This invention relates generally to semiconductor structures and devices for optical communication signal handling apparatuses and to a method for their fabrication. This invention more specifically relates to compound semiconductor structures and devices and to the fabrication and use of semiconductor structures, devices, and integrated circuits that include a monocrystalline compound semiconductor material.

BACKGROUND OF THE INVENTION

The preferred embodiment of the present invention is an apparatus for effecting communications by a home station among a plurality of remote stations in at least one communication medium. The apparatus comprises (a) local signal receiving circuitry for receiving an originating signal at the home station, the originating signal contains local intelligence; and (b) local signal processing circuitry coupled with the local signal receiving circuitry for processing the originating signal for conveying the local intelligence via the at least one communication medium to a selected remote station of the plurality of remote stations. The local signal receiving circuitry and the local signal processing circuitry are implemented in a unitary structure borne upon a single silicon substrate. The apparatus may further comprise (c) remote signal receiving circuitry for receiving a transmitted signal at the home station, the transmitted signal containing remote intelligence; and (d) remote signal processing circuitry coupled with the remote signal receiving circuitry for processing the transmitted signal for conveying the remote intelligence to a user. The remote signal receiving circuitry and the remote signal processing circuitry are preferably implemented in the unitary structure.

The method of the present invention preferably comprises the steps of: (a) providing an apparatus according to the unitary structure described above implemented in a unitary structure borne upon a single silicon substrate; (b) providing information processing circuitry for dynamically determining ad hoc network routing among the plurality of remote stations for establishing communications with at least one target remote station of the at least one selected remote stations not in direct communication with the home station. The information processing circuitry is preferably implemented in the unitary structure. The method proceeds with the steps of (c) ascertaining input capabilities and output capabilities of the home station; (d) polling the at least one selected remote station to ascertain network capabilities of the at least one selected remote station; (e) defining at least one primary network route among the at least one selected remote station for communicating with the at least one target remote station; and (f) conveying the local intelligence via the at least one communication medium to the at least one selected remote station using the at least one primary network route.

The vast majority of semiconductor discrete devices and integrated circuits employed for communications, including high-speed communications, are fabricated from silicon, at least in part because of the availability of inexpensive, high quality monocrystalline silicon substrates. Other semiconductor materials, such as the so called compound semiconductor materials, have physical attributes, including wider bandgap and/or higher mobility than silicon, or direct bandgaps that makes these materials advantageous for certain types of semiconductor devices. Unfortunately, compound semiconductor materials are generally much more expensive than silicon and are not available in large wafers as is silicon. Gallium arsenide (GaAs), the most readily available compound semiconductor material, is available in wafers only up to about 150 millimeters (mm) in diameter. In contrast, silicon wafers are available up to about 300 mm and are widely available at 200 mm. The 150 mm GaAs wafers are many times more expensive than are their silicon counterparts. Wafers of other compound semiconductor materials are even less available and are more expensive than GaAs.

Because of the desirable characteristics of compound semiconductor materials, and because of their present generally high cost and low availability in bulk form, for many years attempts have been made to grow thin films of the compound semiconductor materials on a foreign substrate. To achieve optimal characteristics of the compound semiconductor material, however, a monocrystalline film of high crystalline quality is desired. Attempts have been made, for example, to grow layers of a monocrystalline compound semiconductor material on germanium, silicon, and various insulators. These attempts have generally been unsuccessful because lattice mismatches between the host crystal and the grown crystal have caused the resulting thin film of compound semiconductor material to be of low crystalline quality.

If a large area thin film of high quality monocrystalline compound semiconductor material was available at low cost, a variety of semiconductor devices could advantageously be fabricated in that film at a low cost compared to the cost of fabricating such devices on a bulk wafer of compound semiconductor material or in an epitaxial film of such material on a bulk wafer of compound semiconductor material. In addition, if a thin film of high quality monocrystalline compound semiconductor material could be realized on a bulk wafer such as a silicon wafer, an integrated device structure could be achieved that took advantage of the best properties of both the silicon and the compound semiconductor material.

Accordingly, a need exists for a semiconductor structure that provides a high quality monocrystalline compound semiconductor film over another monocrystalline material and for a process for making such a structure.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Figure 1:
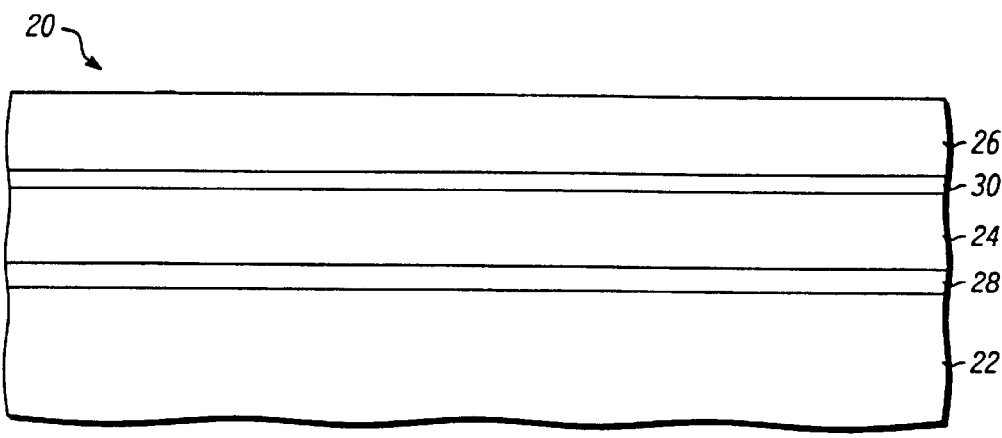
FIGS. 1–3 illustrate schematically, in cross section, device structures in accordance with various embodiments of the invention.

FIG. 1 illustrates schematically, in cross section, a portion of a semiconductor structure 20 in accordance with an embodiment of the invention. Semiconductor structure 20 includes a monocrystalline substrate 22, accommodating buffer layer 24 comprising a monocrystalline material, and a layer 26 of a monocrystalline compound semiconductor material. In this context, the term "monocrystalline" shall have the meaning commonly used within the semiconductor industry. The term shall refer to materials that are a single crystal or that are substantially a single crystal and shall include those materials having a relatively small number of defects such as dislocations and the like as are commonly found in substrates of silicon or germanium or mixtures of silicon and germanium and epitaxial layers of such materials commonly found in the semiconductor industry.

In accordance with one embodiment of the invention, structure 20 also includes an amorphous intermediate layer 28 positioned between substrate 22 and accommodating buffer layer 24, Structure 20 may also include a template layer 30 between the accommodating buffer layer and compound semiconductor layer 26. As will be explained more fully below, the template layer helps to initiate the growth of the compound semiconductor layer on the accommodating buffer layer. The amorphous intermediate layer helps to relieve the strain in the accommodating buffer layer and by doing so, aids in the growth of a high crystalline quality accommodating buffer layer.

Substrate 22, in accordance with an embodiment of the invention, is a monocrystalline semiconductor wafer, preferably of large diameter. The wafer can be of a material from Group IV of the periodic table, and preferably a material from Group IVA. Examples of Group IV semiconductor materials include silicon, germanium, mixed silicon and germanium, mixed silicon and carbon, mixed silicon, germanium and carbon, and the like. Preferably substrate 22 is a wafer containing silicon or germanium, and most preferably is a high quality monocrystalline silicon wafer as used in the semiconductor industry. Accommodating buffer layer 24 is preferably a monocrystalline oxide or nitride material epitaxially grown on the underlying substrate. In accordance with one embodiment of the invention, amorphous intermediate layer 28 is grown on substrate 22 at the interface between substrate 22 and the growing accommodating buffer layer by the oxidation of substrate 22 during the growth of layer 24. The amorphous intermediate layer serves to relieve strain that might otherwise occur in the monocrystalline accommodating buffer layer as a result of differences in the lattice constants of the substrate and the buffer layer. As used herein, lattice constant refers to the distance between atoms of a cell measured in the plane of the surface. If such strain is not relieved by the amorphous intermediate layer, the strain may cause defects in the crystalline structure of the accommodating buffer layer. Defects in the crystalline structure of the accommodating buffer layer, in turn, would make it difficult to achieve a high quality crystalline structure in monocrystalline compound semiconductor layer 26.

Accommodating buffer layer 24 is preferably a monocrystalline oxide or nitride material selected for its crystalline compatibility with the underlying substrate and with the overlying compound semiconductor material. For example, the material could be an oxide or nitride having a lattice structure matched to the substrate and to the subsequently applied semiconductor material. Materials that are suitable for the accommodating buffer layer include metal oxides such as the alkaline earth metal titanates, alkaline earth metal zirconates, alkaline earth metal hafnates, alkaline earth metal tantalates, alkaline earth metal ruthenates, alkaline earth metal niobates, alkaline earth metal vanadates, perovskite oxides such as alkaline earth metal tin-based perovskites; lanthanum aluminate, lanthanum scandium oxide, and gadolinium oxide. Additionally, various nitrides such as gallium nitride, aluminum nitride, and boron nitride may also be used for the accommodating buffer layer. Most of these materials are insulators, although strontium ruthenate, for example, is a conductor. Generally, these materials are metal oxides or metal nitrides, and more particularly, these metal oxide or nitrides typically include at least two different metallic elements. In some specific applications, the metal oxides or nitride may include three or more different metallic elements.

Amorphous interface layer 28 is preferably an oxide formed by the oxidation of the surface of substrate 22, and more preferably is composed of a silicon oxide. The thickness of layer 28 is sufficient to relieve strain attributed to mismatches between the lattice constants of substrate 22 and accommodating buffer layer 24. Typically, layer 28 has a thickness in the range of approximately 0.5–5 nm.

The compound semiconductor material of layer 26 can be selected, as needed for a particular semiconductor structure, from any of the Group IIIA and VA elements (III–V semiconductor compounds), mixed III–V compounds, Group II (A or B) and VIA elements (II–VI semiconductor compounds), and mixed II–VI compounds. Examples include gallium arsenide (GaAs), gallium indium arsenide (GaInAs), gallium aluminum arsenide (GaAlAs), indium phosphide (InP), cadmium sulfide (CdS), cadmium mercury telluride (CdHgTe), zinc selenide (ZnSe), zinc sulfur selenide (ZnSSe), and the like. Suitable template materials chemically bond to the surface of the accommodating buffer layer 24 at selected sites and provide sites for the nucleation of the epitaxial growth of the subsequent compound semiconductor layer 26. Appropriate materials for template 30 are discussed below.

Figure 2:
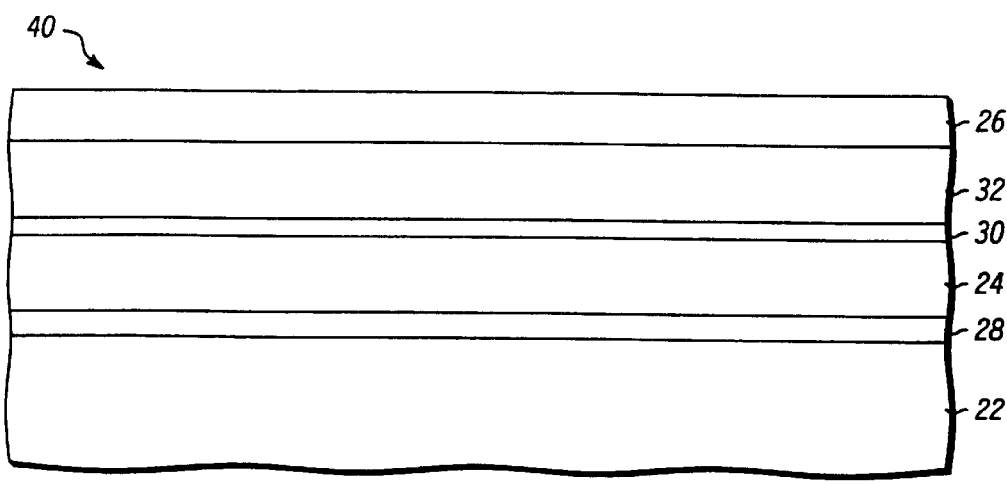

FIG. 2 illustrates, in cross section, a portion of a semiconductor structure 40 in accordance with a further embodiment of the invention. Structure 40 is similar to the previously described semiconductor structure 20, except that an additional buffer layer 32 is positioned between accommodating buffer layer 24 and layer of monocrystalline compound semiconductor material 26. Specifically, the additional buffer layer is positioned between template layer 30 and the overlying layer of compound semiconductor material. The additional buffer layer, formed of a semiconductor or compound semiconductor material, serves to provide a lattice compensation when the lattice constant of the accommodating buffer layer cannot be adequately matched to the overlying monocrystalline compound semiconductor material layer.

Figure 3:
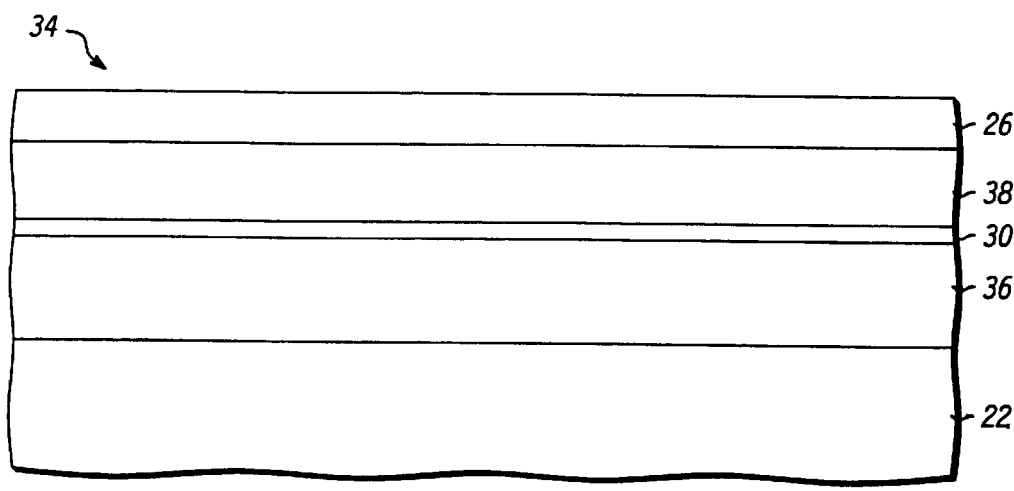

FIG. 3 schematically illustrates, in cross section, a portion of a semiconductor structure 34 in accordance with another exemplary embodiment of the invention. Structure 34 is similar to structure 20, except that structure 34 includes an amorphous layer 36, rather than accommodating buffer layer 24 and amorphous interface layer 28, and an additional semiconductor layer 38.

As explained in greater detail below, amorphous layer 36 may be formed by first forming an accommodating buffer layer and an amorphous interface layer in a similar manner to that described above. Monocrystalline semiconductor layer 26 is then formed (by epitaxial growth) overlying the monocrystalline accommodating buffer layer. The accommodating buffer layer is then exposed to an anneal process to convert the monocrystalline accommodating buffer layer to an amorphous layer. Amorphous layer 36 formed in this manner comprises materials from both the accommodating buffer and interface layers, which amorphous layers may or may not amalgamate. Thus, layer 36 may comprise one or two amorphous layers. Formation of amorphous layer 36 between substrate 22 and semiconductor layer 38 (subsequent to layer 38 formation) relieves stresses between layers 22 and 38 and provides a true compliant substrate for subsequent processing—e.g, compound semiconductor layer 26 formation.

The processes previously described above in connection with FIGS. 1 and 2 are adequate for growing monocrystalline compound semiconductor layers over a monocrystalline substrate. However, the process described in connection with FIG. 3, which includes transforming a monocrystalline accommodating buffer layer to an amorphous oxide layer, may be better for growing monocrystalline compound semiconductor layers because it allows any strain in layer 26 to relax.

Semiconductor layer 38 may include any of the materials described throughout this application in connection with either of compound semiconductor material layer 26 or additional buffer layer 32. For example, layer 38 may include monocrystalline Group IV or monocrystalline compound semiconductor materials.

In accordance with one embodiment of the present invention, semiconductor layer 38 serves as an anneal cap during layer 36 formation and as a template for subsequent semiconductor layer 26 formation. Accordingly, layer 38 is preferably thick enough to provide a suitable template for layer 26 growth (at least one monolayer) and thin enough to allow layer 38 to form as a substantially defect free monocrystalline semiconductor compound.

In accordance with another embodiment of the invention, semiconductor layer 38 comprises compound semiconductor material (e.g., a material discussed above in connection with compound semiconductor layer 26) that is thick enough to form devices within layer 38. In this case, a semiconductor structure in accordance with the present invention does not include compound semiconductor layer 26. In other words, the semiconductor structure in accordance with this embodiment only includes one compound semiconductor layer disposed above amorphous oxide layer 36.

The following non-limiting, illustrative examples illustrate various combinations of materials useful in structures 20, 40, and 34 in accordance with various alternative embodiments of the invention. These examples are merely illustrative, and it is not intended that the invention be limited to these illustrative examples.

EXAMPLE 1

In accordance with one embodiment of the invention, monocrystalline substrate 22 is a silicon substrate oriented in the (100) direction. The silicon substrate can be, for example, a silicon substrate as is commonly used in making complementary metal oxide semiconductor (CMOS) integrated circuits having a diameter of about 200–300 mm. In accordance with this embodiment of the invention, accommodating buffer layer 24 is a monocrystalline layer of $Sr_zBa_{1-z}TiO_3$ where z ranges from 0 to 1 and the amorphous intermediate layer is a layer of silicon oxide ($SiO_x$) formed at the interface between the silicon substrate and the accommodating buffer layer. The value of z is selected to obtain one or more lattice constants closely matched to corresponding lattice constants of the subsequently formed layer 26. The accommodating buffer layer can have a thickness of about 2 to about 100 nanometers (nm) and preferably has a thickness of about 10 nm. In general, it is desired to have an accommodating buffer layer thick enough to isolate the compound semiconductor layer from the substrate to obtain the desired electrical and optical properties. Layers thicker than 100 nm usually provide little additional benefit while increasing cost unnecessarily; however, thicker layers may be fabricated if needed. The amorphous intermediate layer of silicon oxide can have a thickness of about 0.5–5 nm, and preferably a thickness of about 1.5–2.5 nm.

In accordance with this embodiment of the invention, compound semiconductor material layer 26 is a layer of gallium arsenide (GaAs) or aluminum gallium arsenide (AlGaAs) having a thickness of about 1 nm to about 100 micrometers ($\mu$m) and preferably a thickness of about 0.5 $\mu$m to 10 $\mu$m. The thickness generally depends on the application for which the layer is being prepared. To facilitate the epitaxial growth of the gallium arsenide or aluminum gallium arsenide on the monocrystalline oxide, a template layer is formed by capping the oxide layer. The template layer is preferably 1–10 monolayers of Ti—As, Sr—O—As, Sr—Ga—O, or Sr—Al—O. By way of a preferred example, 1–2 monolayers of Ti—As or Sr—Ga—O have been shown to successfully grow GaAs layers.

EXAMPLE 2

In accordance with a further embodiment of the invention, monocrystalline substrate 22 is a silicon substrate as described above. The accommodating buffer layer is a monocrystalline oxide of strontium or barium zirconate or hafnate in a cubic or orthorhombic phase with an amorphous intermediate layer of silicon oxide formed at the interface between the silicon substrate and the accommodating buffer layer. The accommodating buffer layer can have a thickness of about 2–100 nm and preferably has a thickness of at least 5 nm to ensure adequate crystalline and surface quality and is formed of a monocrystalline $SrZrO_3$, $BaZrO_3$, $SrHfO_3$, $BaSnO_3$ or $BaHfO_3$. For example, a monocrystalline oxide layer of $BaZrO_3$ can grow at a temperature of about 700 degrees C. The lattice structure of the resulting crystalline oxide exhibits a 45 degree rotation with respect to the substrate silicon lattice structure.

An accommodating buffer layer formed of these zirconate or hafnate materials is suitable for the growth of compound semiconductor materials in the indium phosphide (InP) system. The compound semiconductor material can be, for example, indium phosphide (InP), indium gallium arsenide (InGaAs), aluminum indium arsenide, (AlInAs), or aluminum gallium indium arsenic phosphide (AlGaAs), having a thickness of about 1.0 nm to 10 $\mu$m. A suitable template for this structure is 1–10 monolayers of zirconium-arsenic (Zr—As), zirconium-phosphorus (Zr—P), hafnium-arsenic (Hf—As), hafnium-phosphorus (Hf—P), strontium-oxygen-arsenic (Sr—O—As), strontium-oxygen-phosphorus (Sr—O—P), barium-oxygen-arsenic (Ba—O—As), indium-strontium-oxygen (In—Sr—O), or barium-oxygen-phosphorus (Ba—O—P), and preferably 1–2 monolayers of one of these materials. By way of an example, for a barium zirconate accommodating buffer layer, the surface is terminated with 1–2 monolayers of zirconium followed by deposition of 1–2 monolayers of arsenic to form a Zr—As template. A monocrystalline layer of the compound semiconductor material from the indium phosphide system is then grown on the template layer. The resulting lattice structure of the compound semiconductor material exhibits a 45 degree rotation with respect to the accommodating buffer layer lattice structure and a lattice mismatch to (100) InP of less than 2.5%, and preferably less than about 1.0%.

EXAMPLE 3

In accordance with a further embodiment of the invention, a structure is provided that is suitable for the growth of an epitaxial film of a II–VI material overlying a silicon substrate. The substrate is preferably a silicon wafer as described above. A suitable accommodating buffer layer material is $Sr_xBa_{1-x}TiO_3$ where x ranges from 0 to 1, having a thickness of about 2–100 nm and preferably a thickness of about 5–15 nm. The II–VI compound semiconductor material can be, for example zinc selenide (ZnSe) or zinc sulfur selenide (ZnSSe). A suitable template for this material system includes 1–10 monolayers of zinc-oxygen (Zn—O) followed by 1–2 monolayers of an excess of zinc followed by the selenidation of zinc on the surface. Alternatively, a template can be, for example, 1–10 monolayers of strontium-sulfur (Sr—S) followed by the ZnSSe.

EXAMPLE 4

This embodiment of the invention is an example of structure 40 illustrated in FIG. 2. Substrate 22, monocrystalline oxide layer 24, and monocrystalline compound semiconductor material layer 26 can be similar to those described in example 1. In addition, an additional buffer layer 32 serves to alleviate any strains that might result from a mismatch of the crystal lattice of the accommodating buffer layer and the lattice of the monocrystalline semiconductor material. Buffer layer 32 can be a layer of germanium or a GaAs, an aluminum gallium arsenide (AlGaAs), an indium gallium phosphide (InGaP), an aluminum gallium phosphide (AlGaP), an indium gallium arsenide (InGaAs), an aluminum indium phosphide (AlInP), a gallium arsenide phosphide (GaAsP), or an indium gallium phosphide (InGaP) strain compensated superlattice. In accordance with one aspect of this embodiment, buffer layer 32 includes a $GaAs_xP_{1-x}$ superlattice, wherein the value of x ranges from 0 to 1. In accordance with another aspect, buffer layer 32 includes an $In_yGa_{1-y}P$ superlattice, wherein the value of y ranges from 0 to 1. By varying the value of x or y, as the case may be, the lattice constant is varied from bottom to top across the superlattice to create a match between lattice constants of the underlying oxide and the overlying compound semiconductor material. The compositions of other materials, such as those listed above, may also be similarly varied to manipulate the lattice constant of layer 32 in a like manner. The superlattice can have a thickness of about 50–500 nm and preferably has a thickness of about 100–200 nm. The template for this structure can be the same of that described in example 1. Alternatively, buffer layer 32 can be a layer of monocrystalline germanium having a thickness of 1–50 nm and preferably having a thickness of about 2–20 nm. In using a germanium buffer layer, a template layer of either germanium-strontium (Ge—Sr) or germanium-titanium (Ge—Ti) having a thickness of about one monolayer can be used as a nucleating site for the subsequent growth of the monocrystalline compound semiconductor material layer. The formation of the oxide layer is capped with either a monolayer of strontium or a monolayer of titanium to act as a nucleating site for the subsequent deposition of the monocrystalline germanium. The monolayer of strontium or titanium provides a nucleating site to which the first monolayer of germanium can bond.

EXAMPLE 5

This example also illustrates material useful in a structure 40 as illustrated in FIG. 2. Substrate material 22, accommodating buffer layer 24, monocrystalline compound semiconductor material layer 26 and template layer 30 can be the same as those described above in example 2. In addition, a buffer layer 32 is inserted between the accommodating buffer layer and the overlying monocrystalline compound semiconductor material layer. The buffer layer, a further monocrystalline semiconductor material, can be, for example, a graded layer of indium gallium arsenide (InGaAs) or indium aluminum arsenide (InAlAs). In accordance with one aspect of this embodiment, buffer layer 32 includes InGaAs, in which the indium composition varies from 0 to about 47%. The additional buffer layer 32 preferably has a thickness of about 10–30 nm. Varying the composition of the buffer layer from GaAs to InGaAs serves to provide a lattice match between the underlying monocrystalline oxide material and the overlying layer of monocrystalline compound semiconductor material. Such a buffer layer is especially advantageous if there is a lattice mismatch between accommodating buffer layer 24 and monocrystalline compound semiconductor material layer 26.

EXAMPLE 6

This example provides exemplary materials useful in structure 34, as illustrated in FIG. 3. Substrate material 22, template layer 30, and monocrystalline compound semiconductor material layer 26 may be the same as those described above in connection with example 1.

Amorphous layer 36 is an amorphous oxide layer which is suitably formed of a combination of amorphous intermediate layer materials (e.g., layer 28 materials as described above) and accommodating buffer layer materials (e.g., layer 24 materials as described above). For example, amorphous layer 36 may include a combination of $SiO_x$ and $Sr_zBa_{1-z}TiO_3$ (where z ranges from 0 to 1), which combine or mix, at least partially, during an anneal process to form amorphous oxide layer 36.

The thickness of amorphous layer 36 may vary from application to application and may depend on such factors as desired insulating properties of layer 36, type of semiconductor material comprising layer 26, and the like. In accordance with one exemplary aspect of the present embodiment, layer 36 thickness is about 2 nm to about 100 nm, preferably about 2–10 nm, and more preferably about 5–6 nm.

Layer 38 comprises a monocrystalline compound semiconductor material that can be grown epitaxially over a monocrystalline oxide material such as material used to form accommodating buffer layer 24. In accordance with one embodiment of the invention, layer 38 includes the same materials as those comprising layer 26. For example, if layer 26 includes GaAs, layer 38 also includes GaAs. However, in accordance with other embodiments of the present invention, layer 38 may include materials different from those used to form layer 26. In accordance with one exemplary embodiment of the invention, layer 38 is about 1 monolayer to about 100 nm thick.

Referring again to FIGS. 1–3, substrate 22 is a monocrystalline substrate such as a monocrystalline silicon substrate. The crystalline structure of the monocrystalline substrate is characterized by a lattice constant and by a lattice orientation. In similar manner, accommodating buffer layer 24 is also a monocrystalline material and the lattice of that monocrystalline material is characterized by a lattice constant and a crystal orientation. The lattice constants of the accommodating buffer layer and the monocrystalline substrate must be closely matched or, alternatively, must be such that upon rotation of one crystal orientation with respect to the other crystal orientation, a substantial match in lattice constants is achieved. In this context the terms "substantially equal" and "substantially matched" mean that there is sufficient similarity between the lattice constants to permit the growth of a high quality crystalline layer on the underlying layer.

Figure 4:
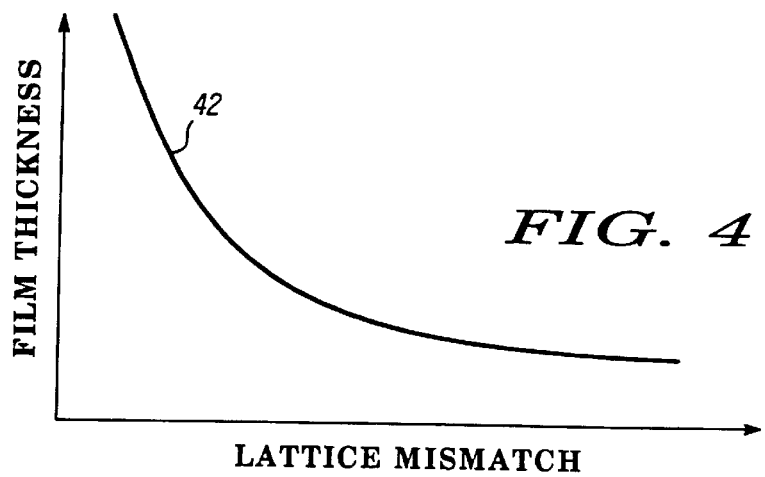
FIG. 4 illustrates graphically the relationship between maximum attainable film thickness and lattice mismatch between a host crystal and a grown crystalline overlayer.

FIG. 4 illustrates graphically the relationship of the achievable thickness of a grown crystal layer of high crystalline quality as a function of the mismatch between the lattice constants of the host crystal and the grown crystal. Curve 42 illustrates the boundary of high crystalline quality material. The area to the right of curve 42 represents layers that tend to be polycrystalline. With no lattice mismatch, it is theoretically possible to grow an infinitely thick, high quality epitaxial layer on the host crystal. As the mismatch in lattice constants increases, the thickness of achievable, high quality crystalline layer decreases rapidly. As a reference point, for example, if the lattice constants between the host crystal and the grown layer are mismatched by more than about 2%, monocrystalline epitaxial layers in excess of about 20 nm cannot be achieved.

In accordance with one embodiment of the invention, substrate 22 is a (100) or (111) oriented monocrystalline silicon wafer and accommodating buffer layer 24 is a layer of strontium barium titanate. Substantial matching of lattice constants between these two materials is achieved by rotating the crystal orientation of the titanate material by 45° with respect to the crystal orientation of the silicon substrate wafer. The inclusion in the structure of amorphous interface layer 28, a silicon oxide layer in this example, if it is of sufficient thickness, serves to reduce strain in the titanate monocrystalline layer that might result from any mismatch in the lattice constants of the host silicon wafer and the grown titanate layer. As a result, in accordance with an embodiment of the invention, a high quality, thick, monocrystalline titanate layer is achievable.

Still referring to FIGS. 1–3, layer 26 is a layer of epitaxially grown monocrystalline material and that crystalline material is also characterized by a crystal lattice constant and a crystal orientation. In accordance with one embodiment of the invention, the lattice constant of layer 26 differs from the lattice constant of substrate 22. To achieve high crystalline quality in this epitaxially grown monocrystalline layer, the accommodating buffer layer must be of high crystalline quality. In addition, in order to achieve high crystalline quality in layer 26, substantial matching between the crystal lattice constant of the host crystal, in this case, the monocrystalline accommodating buffer layer, and the grown crystal is desired. With properly selected materials this substantial matching of lattice constants is achieved as a result of rotation of the crystal orientation of the grown crystal with respect to the orientation of the host crystal. If the grown crystal is gallium arsenide, aluminum gallium arsenide, zinc selenide, or zinc sulfur selenide and the accommodating buffer layer is monocrystalline $Sr_xBa_{1-x}TiO_3$, substantial matching of crystal lattice constants of the two materials is achieved, wherein the crystal orientation of the grown layer is rotated by 45° with respect to the orientation of the host monocrystalline oxide. Similarly, if the host material is a strontium or barium zirconate or a strontium or barium hafnate or barium tin oxide and the compound semiconductor layer is indium phosphide or gallium indium arsenide or aluminum indium arsenide, substantial matching of crystal lattice constants can be achieved by rotating the orientation of the grown crystal layer by 45° with respect to the host oxide crystal. In some instances, a crystalline semiconductor buffer layer between the host oxide and the grown compound semiconductor layer can be used to reduce strain in the grown monocrystalline compound semiconductor layer that might result from small differences in lattice constants. Better crystalline quality in the grown monocrystalline compound semiconductor layer can thereby be achieved.

The following example illustrates a process, in accordance with one embodiment of the invention, for fabricating a semiconductor structure such as the structures depicted in FIGS. 1–3. The process starts by providing a monocrystalline semiconductor substrate comprising silicon or germanium. In accordance with a preferred embodiment of the invention, the semiconductor substrate is a silicon wafer having a (100) orientation. The substrate is preferably oriented on axis or, at most, about 0.5° off axis. At least a portion of the semiconductor substrate has a bare surface, although other portions of the substrate, as described below, may encompass other structures. The term "bare" in this context means that the surface in the portion of the substrate has been cleaned to remove any oxides, contaminants, or other foreign material. As is well known, bare silicon is highly reactive and readily forms a native oxide. The term "bare" is intended to encompass such a native oxide. A thin silicon oxide may also be intentionally grown on the semiconductor substrate, although such a grown oxide is not essential to the process in accordance with the invention. In order to epitaxially grow a monocrystalline oxide layer overlying the monocrystalline substrate, the native oxide layer must first be removed to expose the crystalline structure of the underlying substrate. The following process is preferably carried out by molecular beam epitaxy (MBE), although other epitaxial processes may also be used in accordance with the present invention. The native oxide can be removed by first thermally depositing a thin layer of strontium, barium, a combination of strontium and barium, or other alkaline earth metals or combinations of alkaline earth metals in an MBE apparatus. In the case where strontium is used, the substrate is then heated to a temperature of about 750° C. to cause the strontium to react with the native silicon oxide layer. The strontium serves to reduce the silicon oxide to leave a silicon oxide-free surface. The resultant surface, which exhibits an ordered 2×1 structure, includes strontium, oxygen, and silicon. The ordered 2×1 structure forms a template for the ordered growth of an overlying layer of a monocrystalline oxide. The template provides the necessary chemical and physical properties to nucleate the crystalline growth of an overlying layer.

In accordance with an alternate embodiment of the invention, the native silicon oxide can be converted and the substrate surface can be prepared for the growth of a monocrystalline oxide layer by depositing an alkaline earth metal oxide, such as strontium oxide, strontium barium oxide, or barium oxide, onto the substrate surface by MBE at a low temperature and by subsequently heating the structure to a temperature of about 750° C. At this temperature a solid state reaction takes place between the strontium oxide and the native silicon oxide causing the reduction of the native silicon oxide and leaving an ordered 2×1 structure with strontium, oxygen, and silicon remaining on the substrate surface. Again, this forms a template for the subsequent growth of an ordered monocrystalline oxide layer.

Following the removal of the silicon oxide from the surface of the substrate, in accordance with one embodiment of the invention, the substrate is cooled to a temperature in the range of about 200–800° C and a layer of strontium titanate is grown on the template layer by molecular beam epitaxy. The MBE process is initiated by opening shutters in the MBE apparatus to expose strontium, titanium and oxygen sources. The ratio of strontium and titanium is approximately 1:1. The partial pressure of oxygen is initially set at a minimum value to grow stoichiometric strontium titanate at a growth rate of about 0.3–0.5 nm per minute. After initiating growth of the strontium titanate, the partial pressure of oxygen is increased above the initial minimum value. The overpressure of oxygen causes the growth of an amorphous silicon oxide layer at the interface between the underlying substrate and the growing strontium titanate layer. The growth of the silicon oxide layer results from the diffusion of oxygen through the growing strontium titanate layer to the interface where the oxygen reacts with silicon at the surface of the underlying substrate. The strontium titanate grows as an ordered monocrystal with the crystalline orientation rotated by 45° with respect to the ordered 2×1 crystalline structure of the underlying substrate. Strain that otherwise might exist in the strontium titanate layer because of the small mismatch in lattice constant between the silicon substrate and the growing crystal is relieved in the amorphous silicon oxide intermediate layer.

After the strontium titanate layer has been grown to the desired thickness, the monocrystalline strontium titanate is capped by a template layer that is conducive to the subsequent growth of an epitaxial layer of a desired compound semiconductor material. For the subsequent growth of a layer of gallium arsenide, the MBE growth of the strontium titanate monocrystalline layer can be capped by terminating the growth with 1–2 monolayers of titanium, 1–2 monolayers of titanium-oxygen or with 1–2 monolayers of strontium-oxygen. Following the formation of this capping layer, arsenic is deposited to form a Ti—As bond, a Ti—O—As bond or a Sr—O—As bond. Any of these form an appropriate template for deposition and formation of a gallium arsenide monocrystalline layer. Following the formation of the template, gallium is subsequently introduced to the reaction with the arsenic and gallium arsenide forms. Alternatively, gallium can be deposited on the capping layer to form a Sr—O—Ga bond, and arsenic is subsequently introduced with the gallium to form the GaAs.

Figure 5:
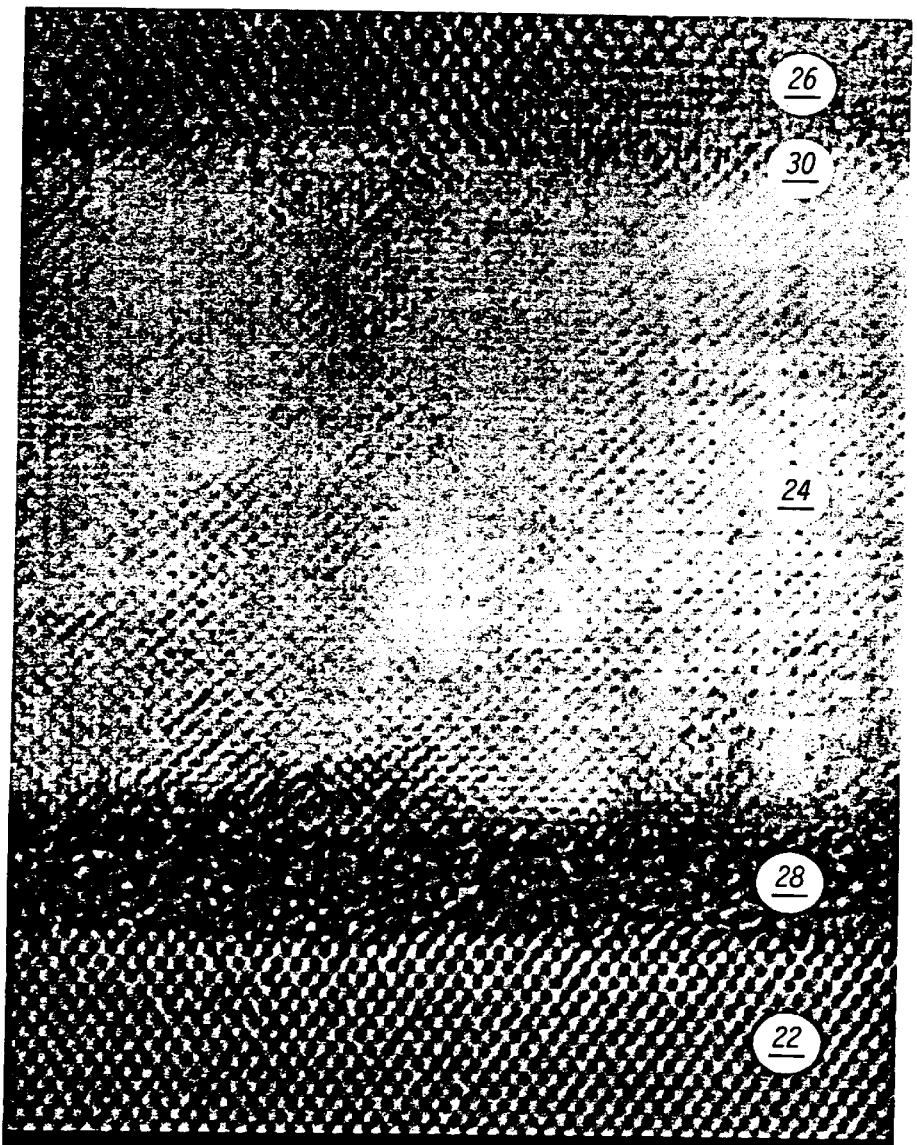
FIG. 5 illustrates a high resolution Transmission Electron Micrograph of a structure including a monocrystalline accommodating buffer layer.

FIG. 5 is a high resolution Transmission Electron Micrograph (TEM) of semiconductor material manufactured in accordance with the present invention. Single crystal $SrTiO_3$ accommodating buffer layer 24 was grown epitaxially on silicon substrate 22. During this growth process, amorphous interfacial layer 28 is formed which relieves strain due to lattice mismatch. GaAs compound semiconductor layer 26 was then grown epitaxially using template layer 30.

Figure 6:
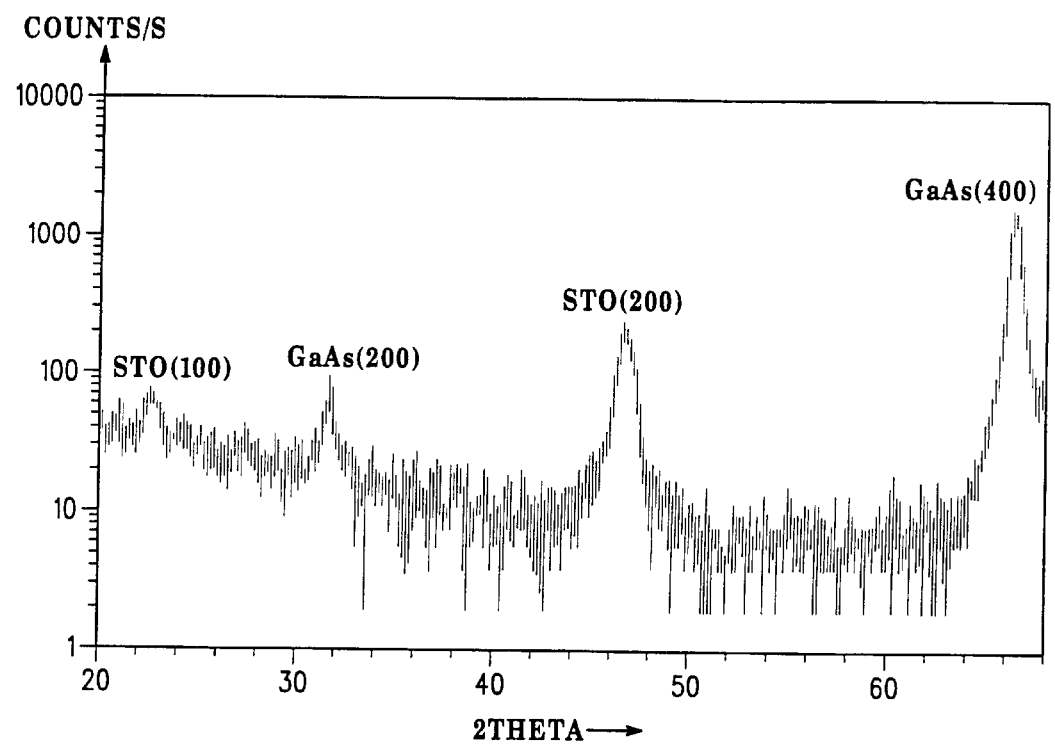
FIG. 6 illustrates an x-ray diffraction spectrum of a structure including a monocrystalline accommodating buffer layer.

FIG. 6 illustrates an x-ray diffraction spectrum taken on a structure including GaAs compound semiconductor layer 26 grown on silicon substrate 22 using accommodating buffer layer 24. The peaks in the spectrum indicate that both the accommodating buffer layer 24 and GaAs compound semiconductor layer 26 are single crystal and (100) orientated.

The structure illustrated in FIG. 2 can be formed by the process discussed above with the addition of an additional buffer layer deposition step. The additional buffer layer 32 is formed overlying the template layer before the deposition of the monocrystalline compound semiconductor layer. If the buffer layer is a compound semiconductor superlattice, such a superlattice can be deposited, by MBE for example, on the template described above. If instead the buffer layer is a layer of germanium, the process above is modified to cap the strontium titanate monocrystalline layer with a final layer of either strontium or titanium and then by depositing germanium to react with the strontium or titanium. The germanium buffer layer can then be deposited directly on this template.

Structure 34, illustrated in FIG. 3, may be formed by growing an accommodating buffer layer, forming an amorphous oxide layer over substrate 22, and growing semiconductor layer 38 over the accommodating buffer layer, as described above. The accommodating buffer layer and the amorphous oxide layer are then exposed to an anneal process sufficient to change the crystalline structure of the accommodating buffer layer from monocrystalline to amorphous, thereby forming an amorphous layer such that the combination of the amorphous oxide layer and the now amorphous accommodating buffer layer form a single amorphous oxide layer 36. Layer 26 is then subsequently grown over layer 38. Alternatively, the anneal process may be carried out subsequent to growth of layer 26.

In accordance with one aspect of this embodiment, layer 36 is formed by exposing substrate 22, the accommodating buffer layer, the amorphous oxide layer, and semiconductor layer 38 to a rapid thermal anneal process with a peak temperature of about 700° C. to about 1000° C. and a process time of about 1 to about 10 minutes. However, other suitable anneal processes may be employed to convert the accommodating buffer layer to an amorphous layer in accordance with the present invention. For example, laser annealing or "conventional" thermal annealing processes (in the proper environment) may be used to form layer 36. When conventional thermal annealing is employed to form layer 36, an overpressure of one or more constituents of layer 30 may be required to prevent degradation of layer 38 during the anneal process. For example, when layer 38 includes GaAs, the anneal environment preferably includes an overpressure of arsenic to mitigate degradation of layer 38.

As noted above, layer 38 of structure 34 may include any materials suitable for either of layers 32 or 26. Accordingly, any deposition or growth methods described in connection with either layer 32 or 26, may be employed to deposit layer 38.

Figure 7:
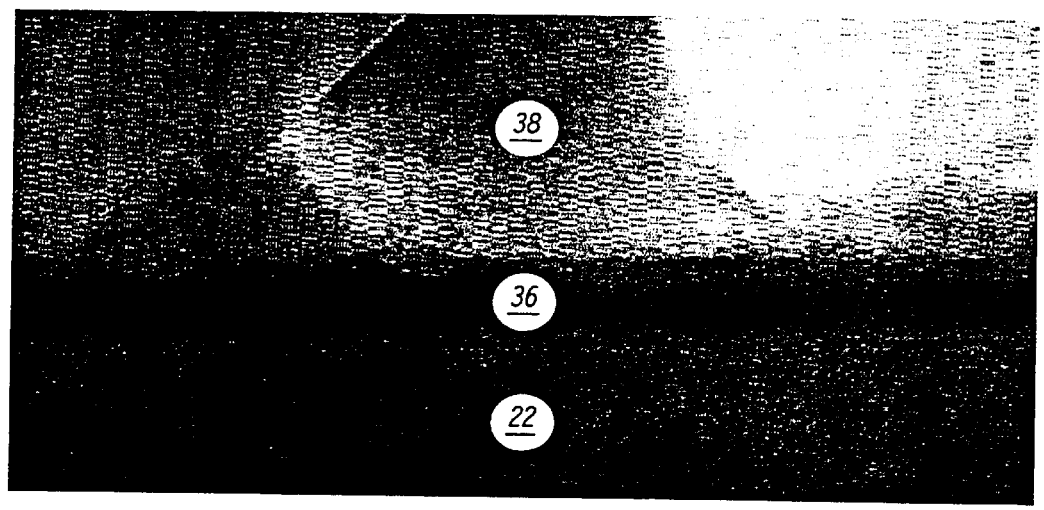
FIG. 7 illustrates a high resolution Transmission Electron Micrograph of a structure including an amorphous oxide layer.

FIG. 7 is a high resolution Transmission Electron Micrograph (TEM) of semiconductor material manufactured in accordance with the embodiment of the invention illustrated in FIG. 3. In accordance with this embodiment, a single crystal SrTiO₃ accommodating buffer layer was grown epitaxially on silicon substrate 22. During this growth process, an amorphous interfacial layer forms as described above. Next, GaAs layer 38 is formed above the accommodating buffer layer and the accommodating buffer layer is exposed to an anneal process to form amorphous oxide layer 36.

Figure 8:
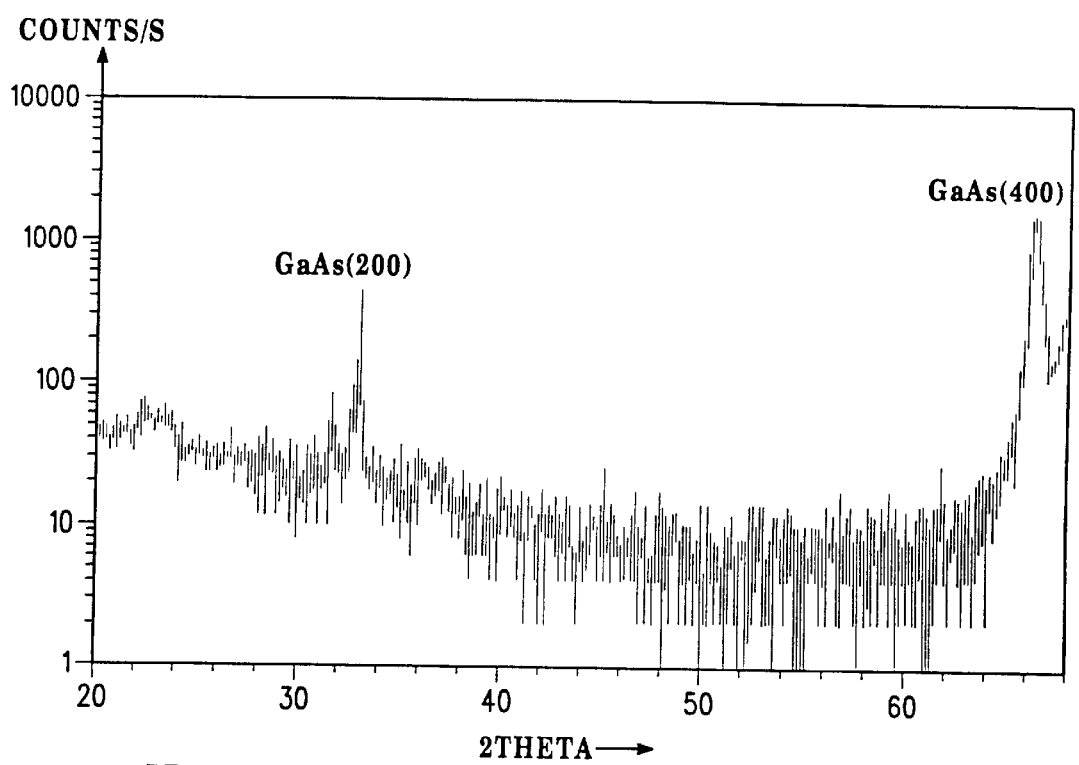
FIG. 8 illustrates an x-ray diffraction spectrum of a structure including an amorphous oxide layer.

FIG. 8 illustrates an x-ray diffraction spectrum taken on a structure including GaAs compound semiconductor layer 38 and amorphous oxide layer 36 formed on silicon substrate 22. The peaks in the spectrum indicate that GaAs compound semiconductor layer 38 is single crystal and (100) orientated and the lack of peaks around 40 to 50 degrees indicates that layer 36 is amorphous.

The process described above illustrates a process for forming a semiconductor structure including a silicon substrate, an overlying oxide layer, and a monocrystalline gallium arsenide compound semiconductor layer by the process of molecular beam epitaxy. The process can also be carried out by the process of chemical vapor deposition (CVD), metal organic chemical vapor deposition (MOCVD), migration enhanced epitaxy (MEE), atomic layer epitaxy (ALE), physical vapor deposition (PVD), chemical solution deposition (CSD), pulsed laser deposition (PLD), or the like. Further, by a similar process, other monocrystalline accommodating buffer layers such as alkaline earth metal titanates, zirconates, haffiates, tantalates, vanadates, ruthenates, and niobates, alkaline earth metal tin-based perovskites, lanthanum aluminate, lanthanum scandium oxide, and gadolinium oxide can also be grown. Further, by a similar process such as MBE, other III–V and II–VI monocrystalline compound semiconductor layers can be deposited overlying the monocrystalline oxide accommodating buffer layer.

Each of the variations of compound semiconductor materials and monocrystalline oxide accommodating buffer layer uses an appropriate template for initiating the growth of the compound semiconductor layer. For example, if the accommodating buffer layer is an alkaline earth metal zirconate, the oxide can be capped by a thin layer of zirconium. The deposition of zirconium can be followed by the deposition of arsenic or phosphorus to react with the zirconium as a precursor to depositing indium gallium arsenide, indium aluminum arsenide, or indium phosphide respectively. similarly, if the monocrystalline oxide accommodating buffer layer is an alkaline earth metal hafnate, the oxide layer can be capped by a thin layer of hafnium. The deposition of hafnium is followed by the deposition of arsenic or phosphorous to react with the hafnium as a precursor to the growth of an indium gallium arsenide, indium aluminum arsenide, or indium phosphide layer, respectively. In a similar manner, strontium titanate can be capped with a layer of strontium or strontium and oxygen and barium titanate can be capped with a layer of barium or barium and oxygen. Each of these depositions can be followed by the deposition of arsenic or phosphorus to react with the capping material to form a template for the deposition of a compound semiconductor material layer comprising indium gallium arsenide, indium aluminum arsenide, or indium phosphide.

Figure 9:
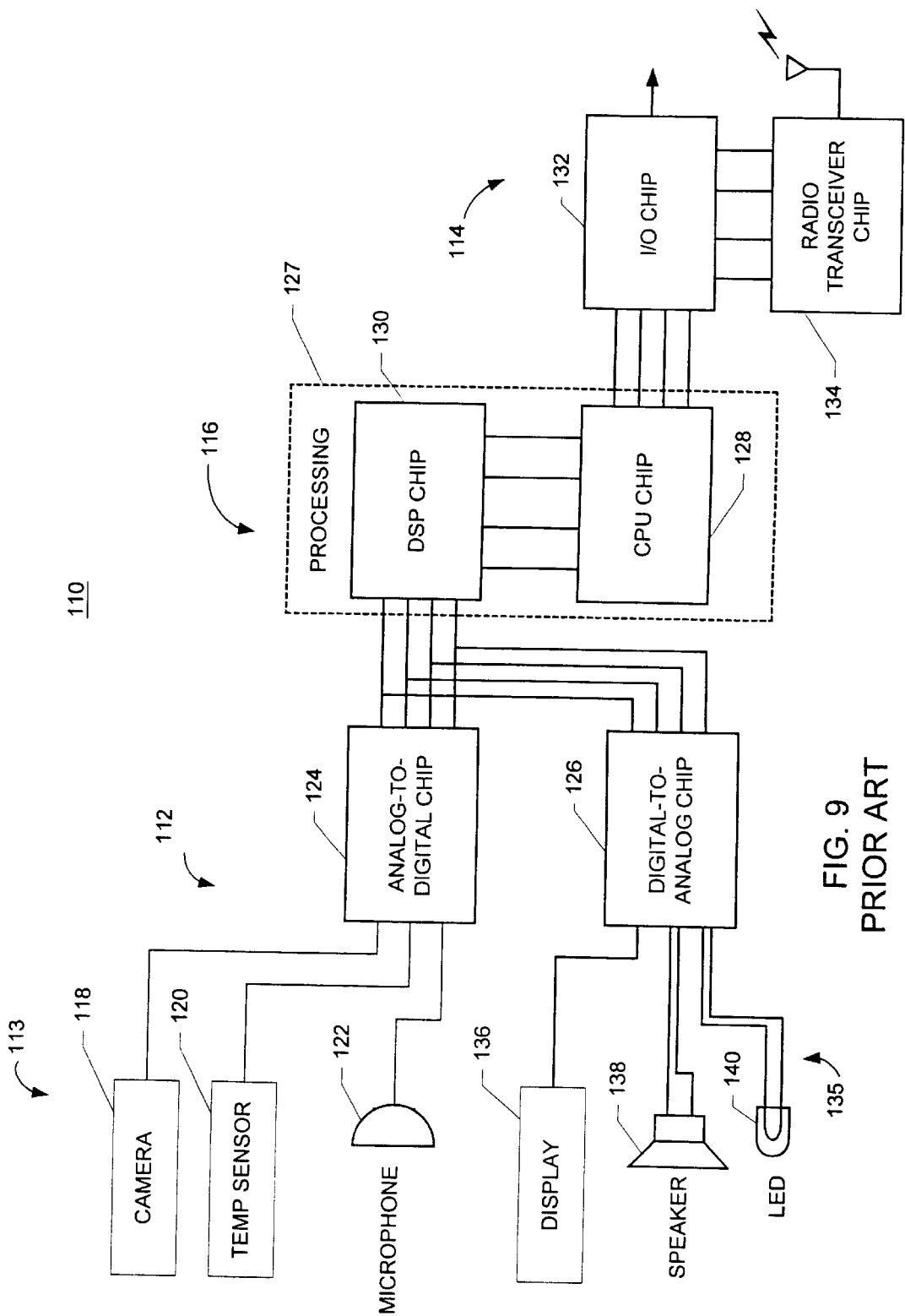
FIG. 9 is a schematic block diagram of a prior art communication apparatus implemented in discrete components.

FIG. 9 is a schematic block diagram of a prior art communication apparatus implemented in discrete components. In FIG. 9, a communication system 110 includes a user interface section 112, a network interface section 114 and a processing section 116.

User interface section 112 includes signal generating input devices 113, such as a camera (e.g., a video camera) 118, a temperature sensor 120 and a microphone 122. User interface section 112 further includes an analog-to-digital device 124 and a digital-to-analog device 126. In some prior art communication apparatuses, analog-to-digital device 124 and digital-to-analog device 126 may be embodied in a single device. Signal generating input devices 113 are coupled with an analog-to-digital device 124 in order that analog signals received from signal input generating devices 113 may be rendered in digital form for further processing. Analog-to-digital device 124 may be bypassed for a particular signal input generating device 113 if the particular device generates a digital signal. Digital signals representing signals received from individual signal input generating devices 113 are provided from analog-to-digital device 124 to processing section 116.

Processing section 116 includes a processing device 127. Processing device 127 preferably includes a general purpose computing device 128 and a digital signal processing device 130. The term general purpose processing device is employed herein to indicate any microprocessor, CPU (central processing unit) or other semiconductor device that is programmable to carry out a variety of functions.

Processing section 116 is connected with network interface section 114. Network interface section 114 includes an 1IO (input/output) device 132. 1IO device 132 may establish an appropriate interface between signals received from processing section 116 for transmission as optically coupled signals to other stations in a network (not shown). More than one interface device may be included in network interface section 114. For example, in FIG. 9, a radio transceiver device 134 is connected with I/O device 132 (alternatively, radio transceiver device 134 may be coupled directly with processing device 127). Radio transceiver device 134 provides an appropriate interface for system 110 to communicate with other network stations using RF (radio frequency) coupling.

Network interface section 114 also provides for reception of transmitted signals from other network stations (e.g., via optically coupled or RF coupled communications). Received signals are provided to processing section 116, and thence to digital-to-analog device 126 and user interface 112. In the case of received signals, user interface 112 employs user devices 135, such as a graphic display device 136, an audio speaker 138 or an indicating light 140 (e.g., an LED—light emitting diode). If a user device 135 is a digitally operated device, digital-to-analog device 126 may be bypassed and a digital signal may be provided directly to an individual user device 135 from processing section 116.

An important structural feature is emphasized in FIG. 9 in that various devices are indicated in FIG. 9 as being embodied in "chips". This distinction is manifested in indications of an analog-to-digital chip 124, a digital-to-analog chip 126, a DSP chip 130, a CPU chip 128, an I/O chip 132 and a radio transceiver chip 134. This characterization is stressed in connection with FIG. 9 to indicate that prior art communication apparatuses of the sort represented by system 110 (FIG. 9) are implemented in discrete chips. The various chips are implemented in various topologies and technologies that are cost effective or otherwise appropriate for their respective operational parameters.

Accordingly, one device may be implemented in silicon, and another device may be implemented in a compound semiconductor material, such as gallium arsenide. An important point in this regard is that there are significant limitations with prior art technology in fabricating devices of such various topologies within one unitary package. Because there is no opportunity with prior art techniques for fabricating the various topologies on a single common substrate, the most "unitary" that a collection of several such devices may achieve is to be contained within a single enclosure, in a "unified packaging" of a plurality of chips in an attempt at a unitary structure.

Substrates employed for such unified packaging, such as alumina substrates, are oriented in a generally planar configuration upon which the various elements (i.e., devices) of the package are arrayed. Variances in the surface of such alumina substrates, measured substantially perpendicular to the plane of the substrate, are quite rough. Such roughness precludes alignment of devices to within micrometer tolerances of vertical displacement from a common plane. Such micrometer tolerances are required, for example, in crafting a unitary collection of optically communicating devices. The alternative available using rough-surfaced prior art substrates, such as alumina substrates, is to fabricate the various optical devices on separate substrates and employ fiber communications, with the attendant required I/O terminations at each end of each fiber connector. Fabricating semiconductor devices on a common substrate during the deposition or other processes used for creating the devices permits vertical placement tolerances on the order of micrometers. Such fine control of vertical placement allows ample latitude for direct optical alignment among devices on a common substrate.

Limitations in placement of devices adjacent each other are also problematic. That is, the spacing between adjacent devices, measured substantially parallel with the plane of the common substrate (e.g., alumina substrate), is limited by the accuracy of placement performed by pick-and-place machinery or similar tools used in manufacturing. As a result, the tolerance of such horizontal proximity placement is on the order of tenths of a millimeter (0.1 mm). Producing semiconductor devices on a common substrate during the deposition or other fabrication processes used for creating the devices involves horizontal placement tolerances on the order of micrometers—a difference by a factor of 100 over prior art production pick-and-place capabilities.

Being able to fabricate semiconductor devices on a common substrate during the deposition or other processes used for creating the devices permits creation of very small, compact devices. Several benefits are realized by such cohesive manufacturing techniques, including: manufacturing costs are reduced; fewer I/O devices are needed; circuit paths are shorter resulting in lower power requirements, lower radiation levels and less electromagnetic noise generation; fewer circuit elements liable to fail means that reliability is increased. Monolithic construction attainable with such unitary structures is more easily sealed against environmental influences. The benefits of such an improved semiconductor manufacturing capability at the fabrication (deposition or other process) level are especially significant in optical systems because various optical elements may be aligned within photolithographical tolerances—on the order of micrometers—to ensure alignment of optical elements such as waveguides, lasers, fibers and other elements. Connecting fibers and I/O terminations intermediate various optical elements are thereby eliminated.

Communication apparatuses constructed in such a process-level unified construction are better aligned, more compact, more reliable and robust, better protectable against environmental influences (including electromagnetic noise), and generally more versatile in their employability for particular applications because of their lower power requirements and smaller size.

Figure 10:
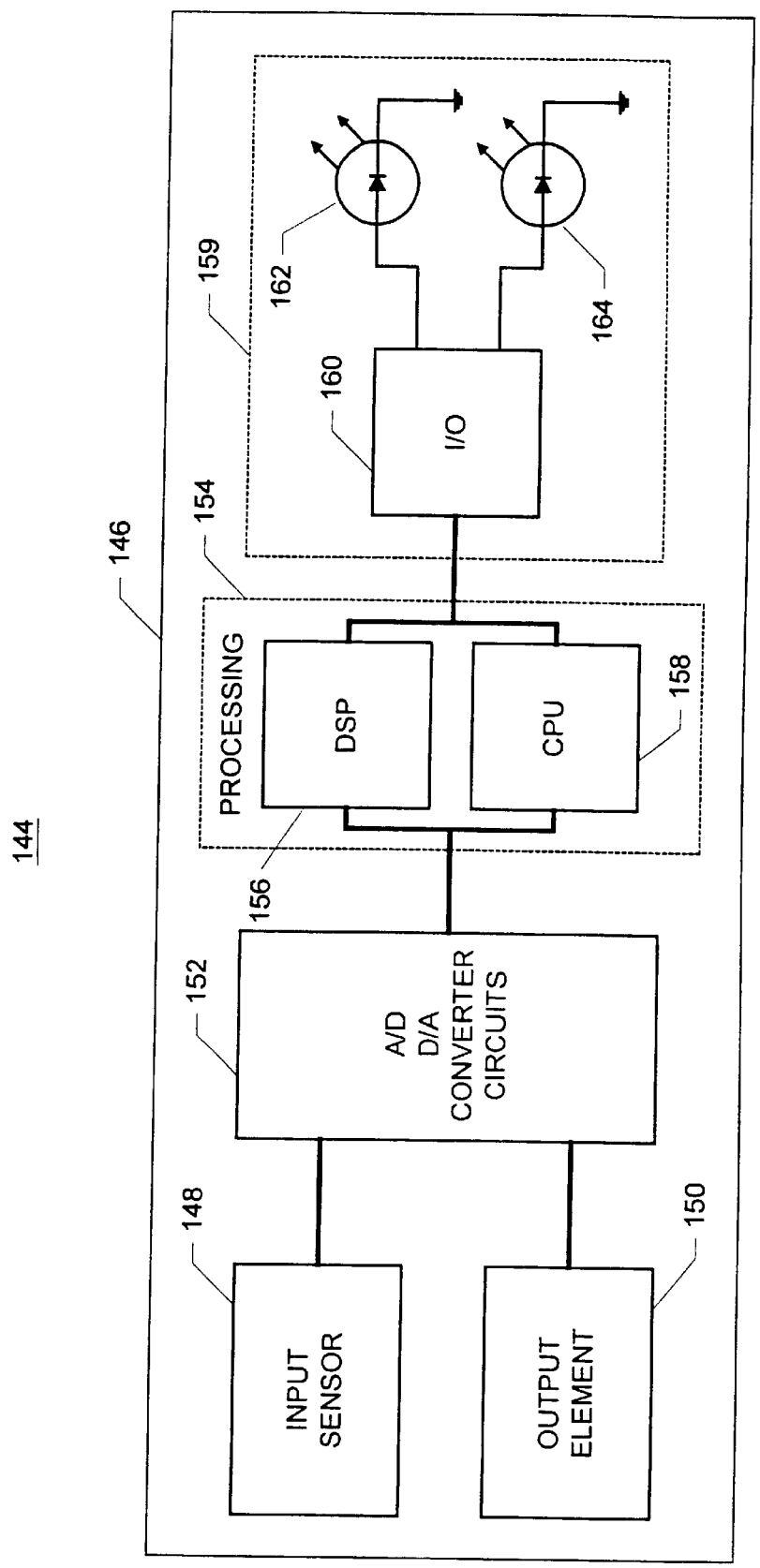
FIG. 10 is a schematic block diagram in plan view of a communication apparatus constructed according to the teachings of the present invention.

FIG. 10 is a schematic block diagram in plan view of a communication apparatus constructed according to the teachings of the present invention. In FIG. 10, a communication apparatus 144 is arrayed upon a substrate 146. Substrate 146 is preferably a common single silicon substrate.

Apparatus 144 includes an input sensor 148 and an output element 150. Input sensor 148 and output element 150 are coupled with a converter circuit 152. Converter circuit 152 performs analog-to-digital conversion and digital-to-analog conversion as needed to present intelligible signals to various elements of communication apparatus 144.

Converter circuit 152 is coupled with a processing unit 154. Processing unit 154 preferably includes a digital signal processor (DSP) 156 and a central processing unit (CPU; e.g., a microprocessor) 158. Digital signal processor 156 and central processing unit 158 are interconnected in order that they may provide mutually supporting operations as required by communication apparatus 144.

Processing unit 154 is coupled with an I/O (input/output) unit 159. I/O unit 159 includes an I/O element 160 and optical elements 162, 164. I/O element 160 performs requisite interface functions to effect proper cooperation and communication between an output element and the remainder of communication apparatus 144. In the embodiment of the present invention illustrated in FIG. 10, I/O element 160 performs interface operations appropriate to facilitate operation of Communication apparatus 144 for reception of optical signals via one of optical elements 162, 164, and to effect transmission of optical signals via the other of optical elements 162, 164.

Respective elements of communication apparatus 144 are illustrated in FIG. 10 as physically displaced in order to facilitate understanding of the invention. In its preferred embodiment, respective elements of communication apparatus 144 are compactly arrayed upon substrate 146 according to the teachings of the present invention. Individual elements of communication apparatus 144 in FIG. 10 are substantially similar to selected elements of apparatus 110 (FIG. 9). For example, input sensor 148 (FIG. 10) may be any one or more of signal generating input devices 113 (FIG. 9), depending upon the particular employment intended for communication apparatus 144. Similarly, output element 150 (FIG. 10) may be any one or more of user devices 135 (FIG. 9), depending upon the particular employment contemplated for communication apparatus 144.

A significant difference between apparatus 110 (FIG. 9 and communication apparatus 144 (FIG. 10) is that the elements of communication apparatus 144 are monolithically fabricated upon a common substrate (preferably a silicon substrate). This feature of communication apparatus 144 is illustrated in FIG. 11.

Figure 11:
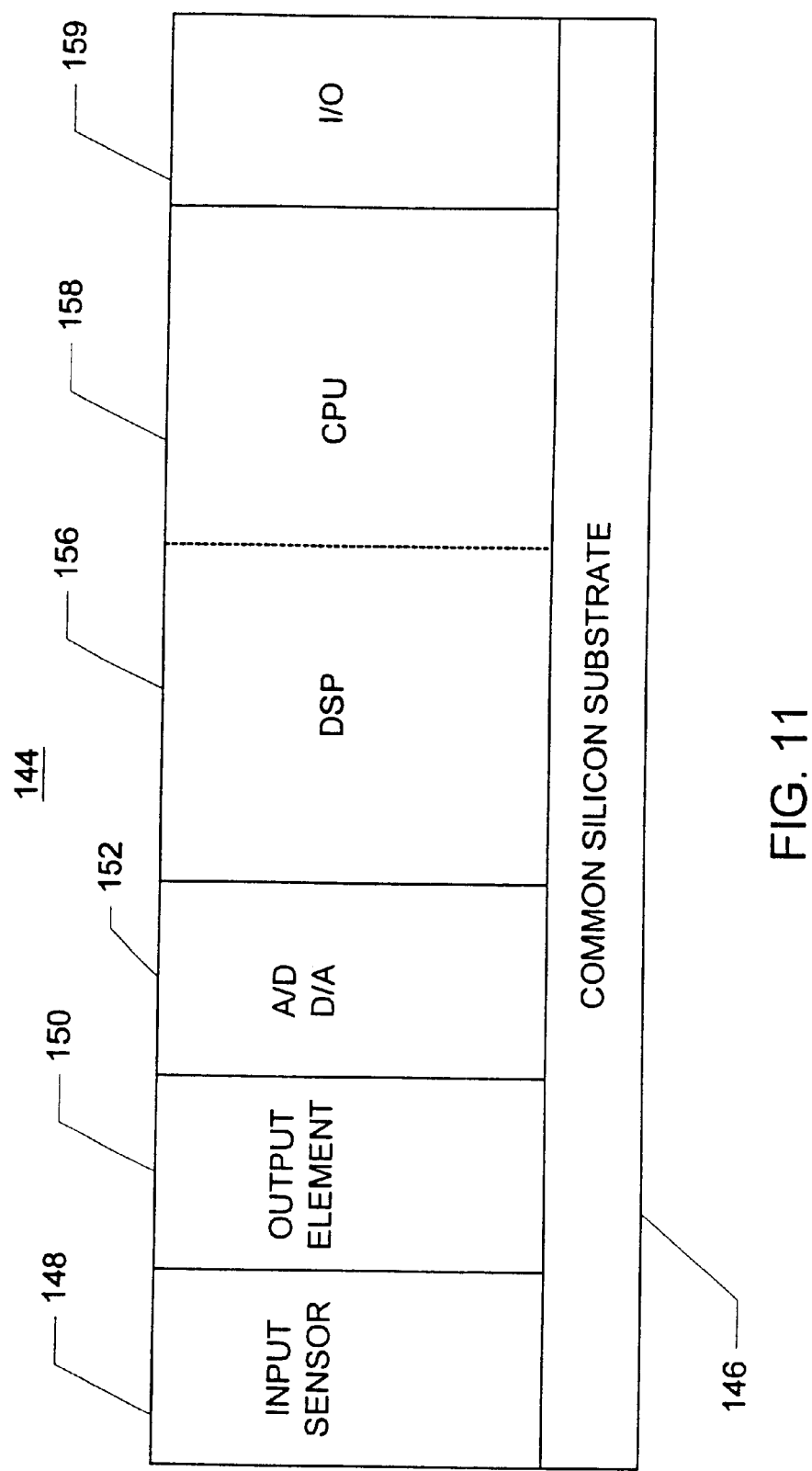
FIG. 11 is a schematic block diagram in elevation view of the communication apparatus constructed according to the teachings of the present invention illustrated in FIG. 10.

FIG. 11 is a schematic block diagram in elevation view of the communication apparatus constructed according to the teachings of the present invention illustrated in FIG. 10. In FIG. 11, communication apparatus 144 is comprised of a plurality of elements arrayed upon a common silicon substrate 146. The elements are preferably monolithically fabricated as a unitary structure. Thus, input sensor 148, output element 150, converter circuit 152, digital signal processor 156, central processing unit 158 and I/O unit 159 are substantially intimately situated and connected upon substrate 146.

Figure 12:
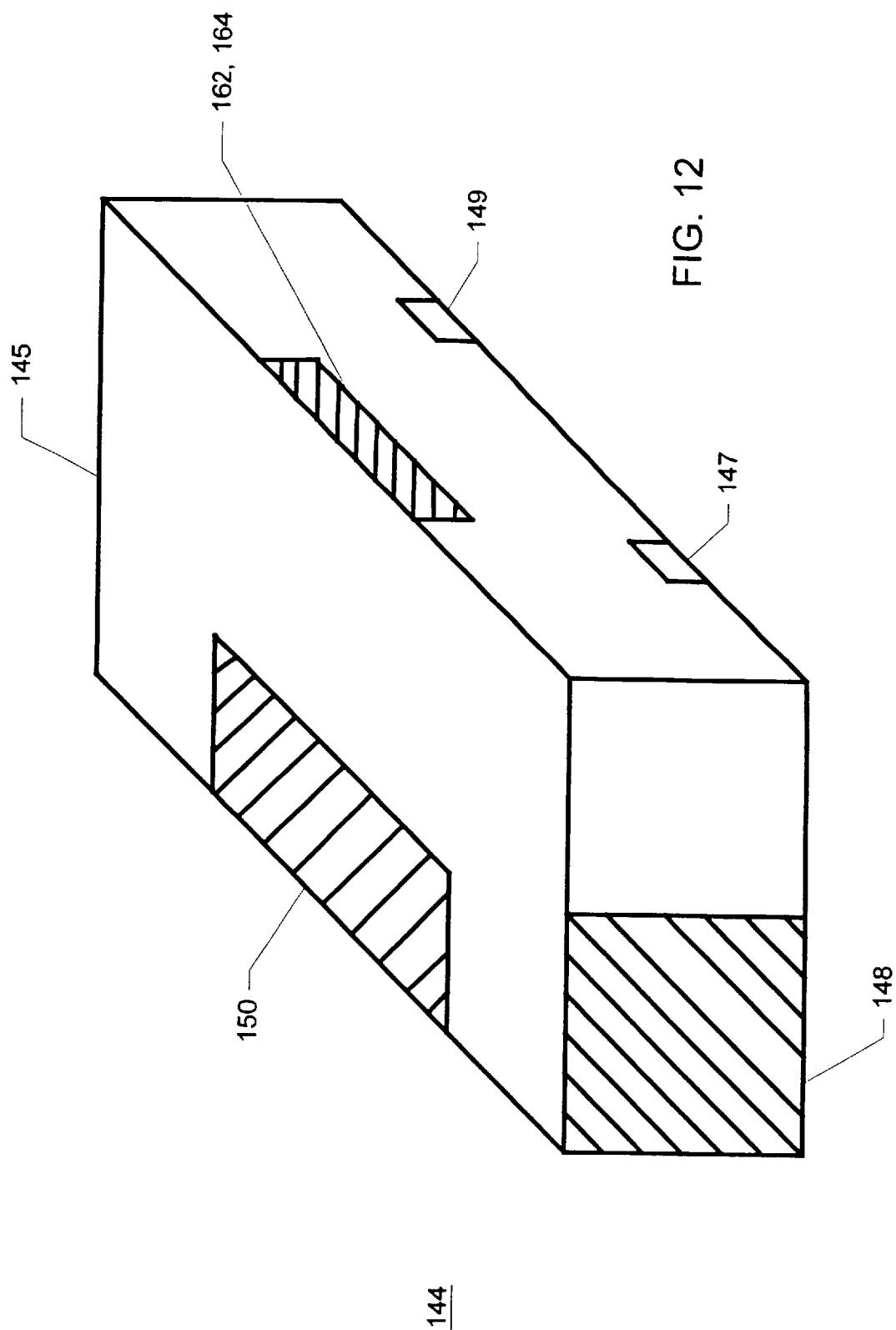
FIG. 12 is a perspective illustration of a representative communication product including the apparatus described in connection with FIGS. 10 and 11.

FIG. 12 is a perspective illustration of a representative communication product including the apparatus described in connection with FIGS. 10 and 11. In FIG. 12, communication apparatus 144 is contained as a unitary structure within an enclosure 145; as a result, only some aspects of communication apparatus 144 are visible in FIG. 12. Enclosure 145 provides power supply input nodes 147, 149 for providing power to apparatus 144 from outside enclosure 145, as by a battery or other power source (not shown). Output element 150 is accessible from outside enclosure 145. Input sensor 148 is accessible from outside enclosure 145. Optical elements 162, 164 are accessible from outside enclosure 145.

Figure 13:
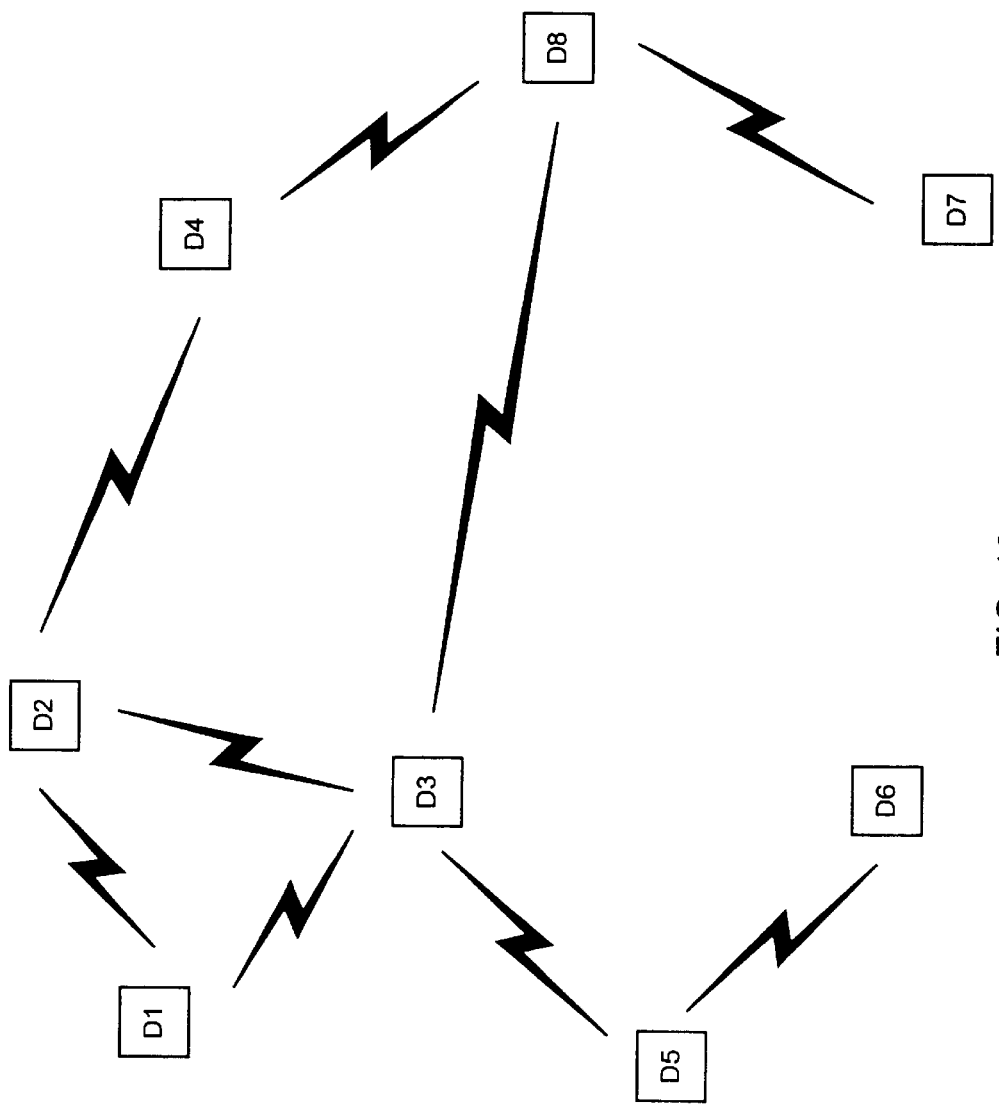
FIG. 13 is a schematic diagram illustrating dynamic network routing.

FIG. 13 is a schematic diagram illustrating dynamic network routing. In FIG. 13, a plurality of devices D1, D2, D3, D4, D5, D6, D7, D8 are communication capable. Preferably, devices D1, D2, D3, D4, D5, D6, D7, D8 are portable communication devices fabricated according to the teachings of the present invention. Each of devices D1, D2, D3, D4, D5, D6, D7, D8 may communicate with another device, unless there is a communication obstruction of some sort. Such a communication obstruction may be, for example, a large building or a passing truck or bus between devices. In the event that two stations are precluded from communicating, as is the case in FIG. 13 with devices D7, D6, there may be an ad hoc network connection established between device D7 and device D6 via devices D8, D3, D5. A communication apparatus having a capability to poll devices with which one has communications and dynamically establish an ad hoc network communication connection with a desired remote station is a preferred embodiment of the present invention.

Figure 14:
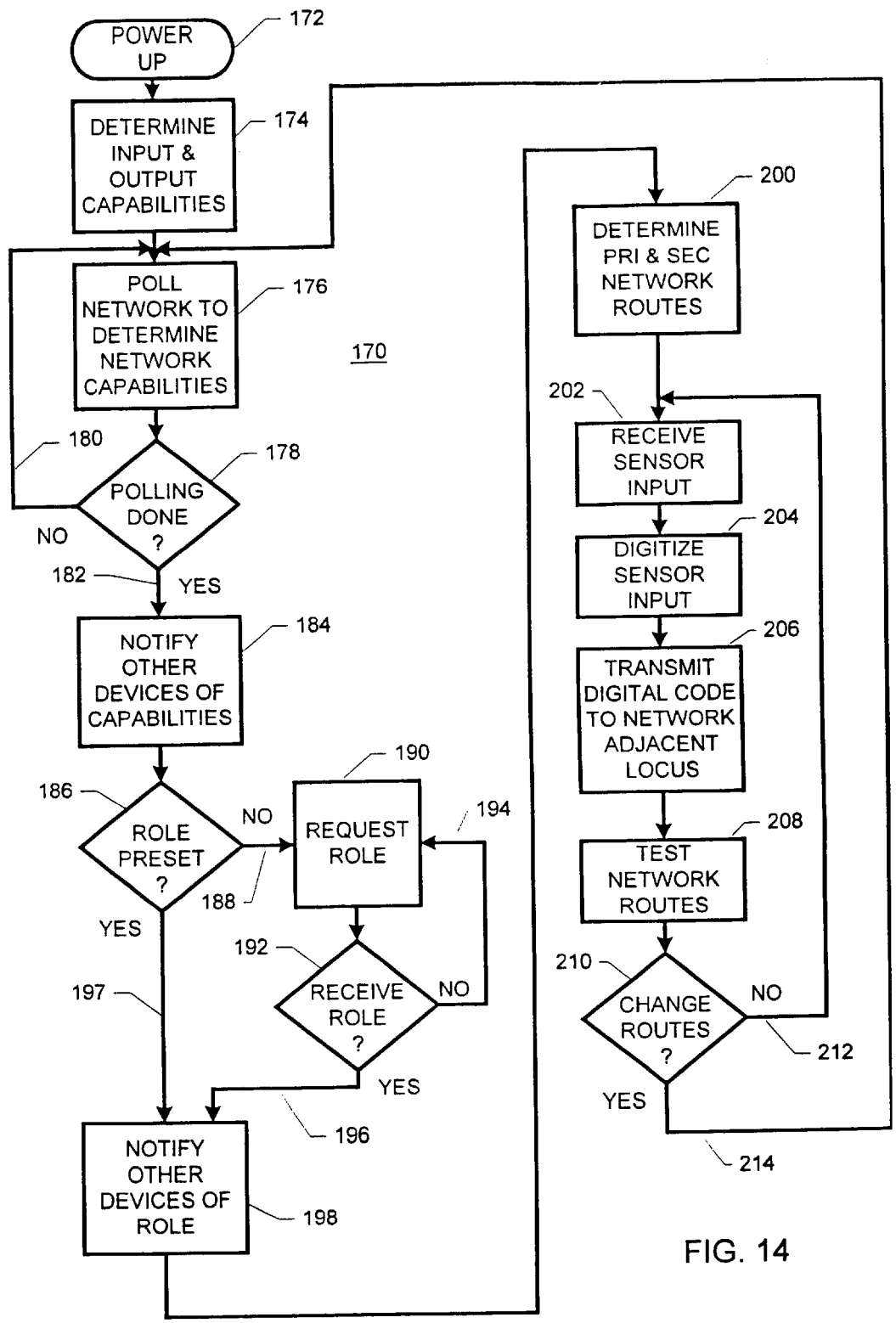
FIG. 14 is a flow chart illustrating the preferred embodiment of the method of the present invention.

FIG. 14 is a flow chart illustrating the preferred embodiment of the method of the present invention. The method illustrated in FIG. 14 is appropriate for employment in the milieu described in connection with FIG. 13. In FIG. 14, a method 170 begins with powering up a home (i.e., one's own) communication device (e.g., communication apparatus 144; FIGS. 10–12), as indicated by a block 172. The method continues by the home device determining its own input sensor capabilities and its own output element capabilities, as indicated by a block 174. That is, the home device determines whether it has, for example, a microphone or a temperature sensor or some other input sensor or sensors. The home device also, for example, determines its output elements, such as an audio speaker, a graphic display, or some other user interface.

Next, the home device polls other devices to ascertain their respective capabilities, including their sensor capabilities, their output capabilities and their networking capabilities, as indicated by a block 176. Among the capabilities ascertained by the polling according to block 176 is the iterative networking capacity of each device polled. That is, to how many subsequent stations, or devices, can a respective device manage network communications. By way of example, in FIG. 13, device D8 manages network communications to three iterations to establish the ad hoc network enabling device D7 to communicate with device D6.

The method continues by posing a query whether the polling operation is complete, as indicated by a query block 178. If the polling operation is not complete, the method proceeds according to "NO" response line 180 and polling continues according to block 176. If the polling operation is complete, the method proceeds according to "YES" response line 182, and the method continues as the home device notifies other devices of its own capabilities, as indicated by a block 184.

Next a query is posed whether the home device has a preset role in its participation in networking operations, as indicated by a query block 186. This query is to determine how the home device is to participate during communications. For example, the home device may be relaying information in participating in an ad hoc network, or the home device may be originating message traffic, or some other role may pertain.

If the home device does not have a preset role, the method proceeds according to "NO" response line 188 and a role is requested, as indicated by a block 190. Another query is posed whether the home device has received a role, as indicated by a query block 192. If the home device has not received a role, the method proceeds according to "NO" response line 194 and a request for a role is repeated according to block 190. If the home device has received a role as a result of the request according to block 190, the method proceeds according to "YES" response line 196 and other devices are notified of the role of the home device, as indicated by a block 198. If the role of the home device is preset, the method proceeds from query block 186 according to "YES" response line 197 directly to block 198, and other devices are notified of the role of the home device.

The method continues by determining a preferred (i.e., primary) network route and alternative (i.e., one or more secondary) networking routes, as indicated by a block 200. At this point in the method, the home device is ready to participate in communication operations, and input is received by the home device from its sensor input, as indicated by a block 202. The method continues with the conversion of the received sensor input signal into a digital signal (if necessary) as indicated by a block 204. The digitized signal is transmitted to an adjacent device, at an adjacent network locus, as indicated by a block 206. The determination of which is the next network locus to which the transmission is made is preferably based upon the role and route determinations ascertained earlier in connection with blocks 184 through 200.

The method provides for periodic testing of the network routes being used, as indicated by a block 208. A query is posed following a route testing whether the routes should be changed, as indicated by a query block 210. If it is determined (according to some predetermined criteria) that the routes should not be changed, the method proceeds according to "NO" response line 212 and a subsequent sensor input is received according to block 202. If it is determined that the routes should be changed, the method proceeds according to "YES" response line 214 and the method continues at block 176.

In the foregoing specification, the invention has been described with reference to specific embodiments. However, one of ordinary skill in the art appreciates that various modifications and changes can be made without departing from the scope of the present invention as set forth in the claims below. Accordingly, the specification and FIGS. are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. An apparatus for effecting communications in at least one communication medium intermediate a plurality of stations, the apparatus comprising:

a monocrystalline silicon substrate;

a monocrystalline perovskite oxide material overlying at least a portion of the monocrystalline silicon substrate;

an amorphous oxide material located between the monocrystalline perovskite oxide material and the monocrystalline silicon substrate;

a monocrystalline compound semiconductor material overlying at least a portion of the monocrystalline perovskite oxide material;

at least one signal input device;

at least one signal output device;

at least one signal conversion device; said at least one signal conversion device being coupled with said at least one signal input device and with said at least one signal output device;

an information processing device; said information processing device being coupled with said at least one signal conversion device; and at least one interface device, said at least one interface device being coupled with said information processing device, said at least one interface device effecting said communications employing at least one selected communication medium of said at least one communication medium, said at least one signal input device, said at least one signal output device, said at least one signal conversion device, said information processing device and said at least one interface device being implemented in a unitary structure borne upon said monocrystalline silicon substrate, and wherein at least a portion of the information processing device is formed within the monocrystalline silicon substrate.

2. An apparatus for effecting communications in at least one communication medium intermediate a plurality of stations as recited in claim 1, wherein at least a portion of one of said at least one signal input device, said at least one signal output device, said at least one signal conversion device, and said at least one interface device is formed within the monocrystalline compound semiconductor material.

3. An apparatus for effecting communications in at least one communication medium intermediate a plurality of stations as recited in claim 1 or 2 wherein said implementing said unitary structure is comprised of the following steps:

(a) growing an oxide on said silicon substrate;

(b) growing a template for a semiconductor piece on said oxide; said semiconductor piece being at least a portion of at least one of said plurality of optical signal handling devices or said at least one electrically driven device to establish a process piece;

(c) annealing said process piece;

(d) growing said semiconductor piece; and (e) repeating steps (a) through (d) until said unitary structure is completed.

4. An apparatus for effecting communications in at least one communication medium intermediate a plurality of stations as recited in claim 1 or 2 wherein said implementing in said unitary structure is comprised of the following steps:

(a) growing an oxide on a silicon substrate;

(b) growing a template for a semiconductor piece on said oxide; said semiconductor piece being at least a portion of at least one of said plurality of optical signal handling devices or said at least one electrically driven device to establish a process piece;

(c) growing said semiconductor piece; and (d) repeating steps (a) through (c) until said unitary structure is completed.

5. An apparatus for effecting communications in at least one communication medium intermediate a plurality of stations as recited in claim 1 wherein said at least one communication medium includes optically coupled communications.

6. An apparatus for effecting communications in at least one communication medium intermediate a plurality of stations as recited in claim 1 wherein said at least one signal input device includes at least one of a camera device, a temperature sensing device, and a microphone device.

7. An apparatus for effecting communications in at least one communication medium intermediate a plurality of stations as recited in claim 1 wherein said at least one signal output device includes at least one of a graphic display device, a speaker and a light emitting device.

8. An apparatus for effecting communications in at least one communication medium intermediate a plurality of stations as recited in claim 1, 2, 5, 6, or 7, wherein said information processing device includes at least a digital signal processing device and a general purpose processing device.

9. An apparatus for effecting communications in at least one communication medium intermediate a plurality of stations as recited in claim 1 wherein said at least one communication medium includes radio frequency communications.

10. An apparatus for effecting communications in at least one communication medium intermediate a plurality of stations as recited in claim 1 wherein said at least one communication medium includes sonically coupled communications.

11. An apparatus for effecting communications in at least one communication medium intermediate a plurality of stations as recited in claim 1 wherein said at least one communication medium includes magnetically coupled communications.

12. An apparatus for effecting communications in at least one communication medium intermediate a plurality of stations as recited in claim 1 wherein said at least one communication medium includes inductively coupled communications.

13. An apparatus for effecting communications in at least one communication medium intermediate a plurality of stations as recited in claim 1 wherein said at least one communication medium includes capacitively coupled communications.

14. The integrated circuit according to claim 1, wherein the monocrystalline perovskite oxide material is rotated with respect to the monocrystalline silicon layer such that the effective lattice mismatch between the monocrystalline perovskite material and the monocrystalline silicon layer is no greater than about 2.0%.

15. The integrated circuit according to claim 1, wherein the monocrystalline compound semiconductor material is rotated with respect to the monocrystalline perovskite oxide material such that the effective lattice mismatch between the monocrystalline compound semiconductor material and the monocrystalline perovskite oxide material is no greater than about 2.0%.

16. The integrated circuit according to claim 1, wherein the amorphous layer is prepared by a process comprising exposing the monocrystalline silicon substrate to the elements of the monocrystalline perovskite material while varying the partial pressure of oxygen to both 1) epitaxially grow the perovskite layer, and 2) form an amorphous silicon oxide layer overlying the silicon substrate.

17. The integrated circuit according to claim 1, wherein the monocrystalline silicon substrate is oriented in the (100) direction.

18. The integrated circuit according to claim 1, wherein the amorphous material includes oxygen and silicon.

19. The integrated circuit according to claim 1, wherein the amorphous oxide material is approximately 0.5 to 5 nanometers thick.

20. The integrated circuit according to claim 1, wherein the amorphous oxide material is approximately 1.5 to 2.5 nanometers thick.

21. The integrated circuit according to claim 1, wherein the monocrystalline perovskite oxide material is $Sr_zBa_{1-z}TiO_3$, wherein z ranges from 0 to 1.

22. The integrated circuit according to claim 1, wherein the monocrystalline compound semiconductor material includes gallium and arsenic.

23. The integrated circuit according to claim 1, wherein the monocrystalline perovskite oxide is strontium titanate, the amorphous layer includes silicon and oxygen, and the monocrystalline compound semiconductor material includes gallium and arsenic.

24. An apparatus for effecting communications by a home station among a plurality of remote stations in at least one communication medium; the apparatus comprising:

a monocrystalline silicon substrate;

a monocrystalline perovskite oxide material overlying at least a portion of the monocrystalline silicon substrate;

an amorphous oxide material located between the monocrystalline perovskite oxide material and the monocrystalline silicon substrate;

a monocrystalline compound semiconductor material overlying at least a portion of the monocrystalline perovskite oxide material;

local signal receiving circuitry for receiving an originating signal at said home station, said originating signal containing local intelligence; and local signal processing circuitry coupled with said local signal receiving circuitry for processing said originating signal for conveying said local intelligence via said at least one communication medium to a selected remote station of said plurality of remote stations;

said local signal receiving circuitry and said local signal processing circuitry being implemented in a unitary structure borne upon said monocrystalline silicon substrate and wherein at least a portion of the local signal processing circuitry is formed within the monocrystalline silicon substrate.

25. An apparatus for effecting communications by a home station among a plurality of remote stations in at least one communication medium as recited in claim 24 wherein the apparatus further comprises:

remote signal receiving circuitry for receiving a transmitted signal at said home station, said transmitted signal containing remote intelligence; and remote signal processing circuitry coupled with said remote signal receiving circuitry for processing said transmitted signal for conveying said remote intelligence to a user, wherein one of said remote signal receiving circuitry and said remote signal processing circuitry arc implemented ill said unit a structure.

26. An apparatus for effecting communications by a home station among a plurality of remote stations in at least one communication medium as recited in claim 24 or 25 wherein the apparatus further comprises information processing circuitry for dynamically determining ad hoc network routing among said plurality of remote stations for establishing communications with at least one target remote station of said plurality of remote stations not in direct communication with said home station; said information processing circuitry being implemented in said unitary structure.

27. An apparatus for effecting communications by a home station among a plurality of remote stations in at least one communication medium as recited in claim 26 wherein said at least one communication medium includes optically coupled communications.

28. An apparatus for effecting communications by a home station among a plurality of remote stations in at least one communication medium as recited in claim 26 wherein said local signal receiving circuitry includes at least one of a camera device, a temperature sensing device, and a microphone device.

29. An apparatus for effecting communications by a home station among a plurality of remote stations in at least one communication medium as recited in claim 26 wherein said remote signal processing circuitry includes at least one of a graphic display device, a speaker and a light emitting device.

30. An apparatus for effecting communications by a home station among a plurality of remote stations in at least one communication medium as recited in claim 26 wherein said information processing circuitry includes at least a digital signal processing device and a general purpose processing device.

31. An apparatus for effecting communications by a home station among a plurality of remote stations in at least one communication medium as recited in claim 26 wherein said at least one communication medium includes radio frequency communications.

32. An apparatus for effecting communications by a home station among a plurality of remote stations in at least one communication medium as recited in claim 26 wherein said at least one communication medium includes sonically coupled communications.

33. An apparatus for effecting communications by a home station among a plurality of remote stations in at least one communication medium as recited in claim 26 wherein said at least one communication medium includes magnetically coupled communications.

34. An apparatus for effecting communications by a home station among a plurality of remote stations in at least one communication medium as recited in claim 26 wherein said at least one communication medium includes inductively coupled communications.

35. An apparatus for effecting communications by a home station among a plurality of remote stations in at least one communication medium as recited in claim 26 wherein said at least one communication medium includes capacitively coupled communications.

36. An apparatus for effecting communications by a home station among a plurality of remote stations in at least one communication medium as recited in claim 24 wherein at least a portion of said local signal receiving circuitry is formed within said monocrystalline compound semiconductor material.

37. An apparatus for effecting communications by a home station among a plurality of remote stations in at least one communication medium as recited in claim 24, 25 or 36 wherein said implementing said unitary structure is comprised of the following steps:
   (a) growing an oxide on said silicon substrate;
   (b) growing a template for a semiconductor piece on said oxide; said semiconductor piece being at least a portion of at least one of said plurality of optical signal handling devices or said at least one electrically driven device to establish a process piece;
   (c) annealing said process piece;
   (d) growing said semiconductor piece; and
   (e) repeating steps (a) through (d) until said unitary structure is completed.

38. An apparatus for effecting communications by a home station among a plurality of remote stations in at least one communication medium as recited in claim 24, 25 or 36 wherein said implementing in said unitary structure is comprised of the following steps:
   (a) growing an oxide on a silicon substrate,
   (b) growing a template for a semiconductor piece on said oxide; said semiconductor piece being at least a portion of at least one of said plurality of optical signal handling devices or said at least one electrically driven device to establish a process piece;
   (c) growing said semiconductor piece; and
   (d) repeating steps (a) through (c) until said unitary structure is completed.

39. A method for effecting communications by a home station among a plurality of remote stations in at least one communication medium; the method comprising:
   receiving an originating signal at said home station by local signal receiving circuitry, said originating signal containing local intelligence;
   processing said originating signal for conveying said local intelligence via said at least one communication medium to at least one selected remote station of said plurality of remote stations, said processing performed by local signal processing circuitry coupled to said local signal receiving circuitry in said home station, said local signal receiving circuitry and said local signal processing circuitry being implemented in a unitary structure comprising
      a monocrystalline silicon substrate;
      a monocrystalline perovskite oxide material overlying at least a portion of the monocrystalline silicon substrate;
      an amorphous oxide material located between the monocrystalline perovskite oxide material and the monocrystalline silicon substrate; and
      a monocrystalline compound semiconductor material overlying at least a portion of the monocrystalline perovskite oxide material;
   receiving a transmitted signal at said home station by remote signal receiving circuitry, said transmitted signal containing remote intelligence;
   processing said transmitted signal for conveying said remote intelligence by remote signal processing circuitry, said remote signal receiving circuitry and said remote signal processing circuitry being implemented in said unitary structure;
   dynamically determining ad hoc network routing among said plurality of remote stations for establishing communications with at least one target remote station of said at least one selected remote stations not in direct communication with said home station using information processing circuitry being implemented in said unitary structure;
   ascertaining input capabilities and output capabilities of said home station;
   polling said at least one selected remote station to ascertain network capabilities of said at least one selected remote station;
   defining at least one primary network route among said at least one selected remote station for communicating with said at least one target remote station; and
   conveying said local intelligence via said at least one communication medium to said at least one target remote station using said at least one primary network route, wherein at least a portion of said local signal processing circuitry is formed within said monocrystalline silicon substrate.

40. A method for effecting communications by a home station among a plurality of remote stations in at least one communication medium as recited in claim 39 wherein said information processing circuitry includes at least a digital signal processing device and a general purpose processing device.

41. A method for effecting communications by a home station among a plurality of remote stations in at least one communication medium as recited in claim 39 wherein at least a portion of one of said local signal receiving circuitry and said remote signal receiving circuitry is formed within said monocrystalline compound semiconductor material.

42. A method for effecting communications by a home station among a plurality of remote stations in at least one communication medium as recited in claim 39 or 41 wherein said implementing said unitary structure is comprised of the following steps:

(a) growing an oxide on said silicon substrate;
(b) growing a template for a semiconductor piece on said oxide; said semiconductor piece being at least a portion of at least one of said plurality of optical signal handling devices or said at least one electrically driven device to establish a process piece;
(c) annealing said process piece;
(d) growing said semiconductor piece; and
(e) repeating steps (a) through (d) until said unitary structure is completed.

43. A method for effecting communications by a home station among a plurality of remote stations in at least one communication medium as recited in claim 39 or 41 wherein said implementing in said unitary structure is comprised of the following steps;
    (a) growing an oxide on a silicon substrate;
    (b) growing a template for a semiconductor piece on said oxide; said semiconductor piece being at least a portion of at least one of said plurality of optical signal handling devices or said at least one electrically driven device to establish a process piece;
    (c) growing said semiconductor piece; and
    (d) repeating steps (a) through (c) until said unitary structure is completed.

* * * * *

UNITED STATES PATENT AND TRADEMARK OFFICE
CERTIFICATE OF CORRECTION

PATENT NO. : 6,427,066 B1  Page 1 of 1
DATED : July 30, 2002
INVENTOR(S) : Gary Grube It is certified that error appears in the above-identified patent and that said Letters Patent is hereby corrected as shown below:

<u>Column 22,</u>
Line 35, delete "ill" and add -- in --.
Line 35, delete "unit a" and add -- unitary --.

Signed and Sealed this

Thirteenth Day of April, 2004

JON W. DUDAS
*Acting Director of the United States Patent and Trademark Office*